(12) United States Patent
Skalecki et al.

(10) Patent No.: US 11,909,645 B2
(45) Date of Patent: *Feb. 20, 2024

(54) SEGMENT ROUTING TRAFFIC ENGINEERING BASED ON LINK UTILIZATION

(71) Applicant: Ciena Corporation, Hanover, MD (US)

(72) Inventors: Darek Skalecki, Ottawa (CA); Gerard L. Swinkels, Ottawa (CA)

(73) Assignee: Ciena Corporation, Hanover, MD (US)

( * ) Notice: Subject to any disclaimer, the term of this patent is extended or adjusted under 35 U.S.C. 154(b) by 225 days.

This patent is subject to a terminal disclaimer.

(21) Appl. No.: 16/958,991

(22) PCT Filed: Jan. 24, 2019

(86) PCT No.: PCT/US2019/014861
§ 371 (c)(1),
(2) Date: Jun. 29, 2020

(87) PCT Pub. No.: WO2019/152247
PCT Pub. Date: Aug. 8, 2019

(65) Prior Publication Data
US 2020/0366613 A1    Nov. 19, 2020

Related U.S. Application Data

(63) Continuation of application No. 15/888,333, filed on Feb. 5, 2018, now Pat. No. 10,541,923.

(51) Int. Cl.
*H04L 47/122* (2022.01)
*H04L 47/11* (2022.01)
(Continued)

(52) U.S. Cl.
CPC ........ *H04L 47/122* (2013.01); *H04L 43/0882* (2013.01); *H04L 45/34* (2013.01);
(Continued)

(58) Field of Classification Search
CPC .. H04L 41/0668; H04L 5/0048; H04W 24/04; H04W 24/08; H04W 72/0413;
(Continued)

(56) References Cited

U.S. PATENT DOCUMENTS 6,816,456 B1 * 11/2004 Tse-Au ............... H04L 47/2416
370/230.1
6,831,895 B1 * 12/2004 Ji ........................... H04L 45/00
709/239
(Continued)

FOREIGN PATENT DOCUMENTS

EP    3 264 695 B1    3/2019
WO    2010056582 A2    5/2010

OTHER PUBLICATIONS

Shakir et al., "Performance Engineered LSPs using the Segment Routing Data-Plane", Routing Working Group, Internet-Draft, Standards Track, Jul. 15, 2013 (Year: 2013).*
(Continued)

*Primary Examiner* — Ian N Moore
*Assistant Examiner* — Sun Jong Kim
(74) *Attorney, Agent, or Firm* — Baratta Law PLLC; Lawrence A. Baratta, Jr.

(57) ABSTRACT

Systems and methods for Segment Routing (SR) Traffic Engineering (SR-TE) in a network include receiving link utilization measurements at a Label Edge Router (LER) with the link utilization measurements flooded by one or more Label Switch Routers (LSRs); and, responsive to one or more of detecting congestion and underutilization on one or more links associated with an SR tunnel at the LER based on the received link utilization measurements, performing one or more actions at the LER to one or more of alleviate the congestion and re-optimize the underutilization. A state of the SR tunnel is maintained only at the LER through a label
(Continued)

stack assigned at the LER, and the label stack includes one or more of a node Segment ID (SID) and an adjacency SID.

17 Claims, 21 Drawing Sheets

(51) Int. Cl.
*H04L 43/0882* (2022.01)
*H04L 45/50* (2022.01)
*H04L 45/00* (2022.01)
*H04L 47/125* (2022.01)
*H04L 47/35* (2022.01)

(52) U.S. Cl.
CPC .............. *H04L 45/50* (2013.01); *H04L 45/70* (2013.01); *H04L 47/11* (2013.01); *H04L 47/125* (2013.01); *H04L 47/35* (2013.01); *H04L 45/22* (2013.01)

(58) Field of Classification Search
CPC ............ H04W 72/046; H04W 36/305; H04W 36/0069; H04W 36/06; H04B 7/0695; H04B 7/088
See application file for complete search history.

(56) References Cited

U.S. PATENT DOCUMENTS

| | | | |
|---|---|---|---|
| 6,842,463 B1 | 1/2005 | Drwiega et al. | |
| 7,136,357 B2 | 11/2006 | Soumiya et al. | |
| 7,161,946 B1 | 1/2007 | Jha | |
| 7,370,119 B2 | 5/2008 | Provine et al. | |
| 7,463,584 B2 | 12/2008 | Allan et al. | |
| 7,463,639 B1 | 12/2008 | Rekhter | |
| 7,616,637 B1 | 11/2009 | Lee et al. | |
| 7,903,554 B1 | 3/2011 | Manur et al. | |
| 8,121,126 B1 | 2/2012 | Moisand et al. | |
| 8,194,554 B2 | 6/2012 | Bragg et al. | |
| 8,223,660 B2 | 7/2012 | Allan et al. | |
| 8,223,668 B2 | 7/2012 | Allan et al. | |
| 8,274,989 B1 | 9/2012 | Allan et al. | |
| 8,693,323 B1 | 4/2014 | McDysan | |
| 8,804,736 B1 | 8/2014 | Drake et al. | |
| 9,049,233 B2 | 6/2015 | Frost et al. | |
| 9,660,897 B1 | 5/2017 | Gredler | |
| 2004/0196827 A1 | 10/2004 | Xu et al. | |
| 2004/0213228 A1 | 10/2004 | Regan et al. | |
| 2005/0053071 A1 | 3/2005 | Betts et al. | |
| 2005/0083842 A1* | 4/2005 | Yang .................. H04L 47/2408 370/230 |
| 2005/0088965 A1 | 4/2005 | Atlas et al. | |
| 2005/0125490 A1 | 6/2005 | Ramia | |
| 2005/0220096 A1 | 10/2005 | Friskney et al. | |
| 2005/0237952 A1* | 10/2005 | Punj ........................ H04L 47/70 370/260 |
| 2007/0053300 A1 | 3/2007 | Zhu et al. | |
| 2007/0076719 A1 | 4/2007 | Allan et al. | |
| 2008/0310417 A1 | 12/2008 | Friskney et al. | |
| 2009/0059799 A1 | 3/2009 | Friskney et al. | |
| 2009/0135815 A1 | 5/2009 | Pacella | |
| 2009/0141703 A1 | 6/2009 | Ghodrat et al. | |
| 2009/0161669 A1 | 6/2009 | Bragg et al. | |
| 2009/0168666 A1 | 7/2009 | Unbehagen et al. | |
| 2009/0168780 A1 | 7/2009 | Unbehagen et al. | |
| 2010/0040061 A1 | 2/2010 | McGuire et al. | |
| 2010/0124225 A1 | 5/2010 | Fedyk | |
| 2010/0124231 A1 | 5/2010 | Kompella | |
| 2011/0205907 A1 | 8/2011 | Kini et al. | |
| 2011/0292836 A1 | 12/2011 | Bragg et al. | |
| 2012/0069745 A1 | 3/2012 | Kini et al. | |
| 2012/0076014 A1* | 3/2012 | Bragg .................... H04L 45/66 370/252 |
| 2012/0224506 A1* | 9/2012 | Gredler ................. H04L 45/121 370/254 |
| 2012/0224579 A1 | 9/2012 | Ashwood-Smith | |
| 2012/0295624 A1* | 11/2012 | Tang ................... H04L 61/2514 455/436 |
| 2013/0003727 A1 | 1/2013 | Ramaraj et al. | |
| 2013/0336116 A1* | 12/2013 | Vasseur ................ H04L 47/825 370/235 |
| 2014/0198634 A1 | 7/2014 | Kumar et al. | |
| 2016/0197784 A1* | 7/2016 | Gandhi ................... H04L 12/12 370/410 |
| 2018/0131616 A1 | 5/2018 | LaBerge et al. | |
| 2018/0167458 A1* | 6/2018 | Ould-Brahim .......... H04L 45/56 |
| 2019/0052349 A1* | 2/2019 | Russell ............. H04B 7/18506 |

OTHER PUBLICATIONS

Katz et al, "Traffic Engineering (TE) Extensions to OSPF Version 2", Network Working Group, RFC: 3630. (Year: 2003).*
Kompella et al, "IS-IS Extensions in Support of Generalized Multi-Protocol Label Switching (GMPLS)", Network Working Group, RFC: 5307. (Year: 2008).*
E. Rosen, A. Viswanathan, R. Callon; MEMO: "Multiprotocol Label Switching Architecture"; Network Working Group; Copyright (C) The Internet Society (Jan. 2001), http://www.ietf.org/rfc/rfc3031.txt.
Y. Rekhter, E. Rosen; MEMO: "Carrying Label Information in BGP-4"; Network Working Group; Copyright (C) The Internet Society (May 2001), http://tools.ietf.org/rfc/rfc3107.txt.
E. Rosen, D. Tappan, G. Fedorkow, Y. Rekhter, D. Farinacci, T. Li, A. Conta; MEMO: "MPLS Label Stack Encoding"; Network Working Group; Copyright (C) The Internet Society (Jan. 2001), http://tools.ietf.org/html/rfc3032.txt.
S. Previdi et al., "Segment Routing with IS-IS Routing Protocol, draft-previdi-filsfils-isis-segment-routing-02", Mar. 2013, http://www.ietf.org/id/draft-previdi-filsfils-isis-segment-routing-02.txt.
C. Filsfils et al., "Segment Routing with MPLS data plane draft-ietf-spring-segment-routing-mpls-03", Feb. 1, 2016, Internet-Draft, Expires Aug. 4, 2016, pp. 1-15.
S. Previdi et al., "IPv6 Segment Routing Header (SRH) draft-previdi-6man-segment-routing-header-07", Jul. 20, 2015, Internet-Draft, Expires Jan. 21, 2016, pp. 1-33.
R. Shakir et al., "Performance Engineered LSPs using the Segment Routing Data-Plane", Routing Working Group, Internet-Draft, Standards Track, Jul. 15, 2013 pp. 1-24.
May 31, 2019, International Search Report for International Application No. PCT/US2019/014861.

* cited by examiner

A,B,C,D,E,F → Node SIDs
1,2,3,4 → Adjacency SIDs
M=X → Link TE Metrics X
U=Y → Unreserved / Unused B/W of Y A,B,C,D,E,F → Node SIDs
1,2,3,4 → Adjacency SIDs
M=X → Link TE Metrics X
U=Y → Unreserved / Unused B/W of Y ●━━● Shortest SR Tunnel to D

SEGMENT ROUTING TRAFFIC ENGINEERING BASED ON LINK UTILIZATION

CROSS-REFERENCE TO RELATED APPLICATION(S)

The present disclosure is a national stage of PCT Application No. PCT/US19/14861, filed on Jan. 24, 2019, and entitled "Segment Routing Traffic Engineering based on link utilization," which claims priority to U.S. patent application Ser. No. 15/888,333, filed Feb. 5, 2018 (now U.S. Pat. No. 10,541,923 which issued on Jan. 21, 2020), and entitled "Segment Routing Traffic Engineering based on link utilization," the contents of each are incorporated by reference in their entirety.

FIELD OF THE DISCLOSURE

The present disclosure generally relates to networking systems and methods. More particularly, the present disclosure relates to Segment Routing (SR) Traffic Engineering (SR-TE) based on link utilization.

BACKGROUND OF THE DISCLOSURE

Segment Routing (SR) is a technology that implements the source routing paradigm. A packet header includes a stack of function identifiers, known as segments, which define an ordered list of functions to be applied to the packet. A segment can represent any instruction, topological or service-based. A segment can have a local semantic to an SR node or global within an SR domain. These functions include, but are not limited to, the forwarding behaviors to be applied successively to the packet, notably destination-based unicast forwarding via a sequence of explicitly enumerated nodes (domain-unique node segments) and links (adjacency segments), and the like. SR allows forcing a flow through any topological path and service chain while maintaining per-flow state only at the ingress node to the SR domain. Segment Routing is described, for example, in Internet Engineering Task Force (IETF) Draft draft-ietf-spring-segment-routing-14, dated Dec. 20, 2017, and entitled "Segment Routing Architecture," the contents of which are incorporated by reference herein (available online at tools.ietf.org/html/draft-ietf-spring-segment-routing-14). A particular attraction of Segment Routing is that it reduces the need to install and maintain any end-to-end (e2e) path state in the core network. Only the ingress node for a particular flow needs to hold the segment stack which is applied as the header of every packet of that flow, to define its route through the network. This makes Segment Routing particularly suited to control by a Software Defined Networking (SDN) model.

Segment Routing can be directly applied to Multiprotocol Label Switching (MPLS) with no change in the forwarding plane. A segment is encoded as an MPLS label. An ordered list of segments is encoded as a stack of labels. The segment to process is on the top of the stack. Upon completion of a segment, the related label is popped from the stack. Segment Routing can also be applied to the Internet Protocol (IP) v6 architecture, with a new type of routing extension header—for example, the document published July 2015 as draft-previdi-6man-segment-routing-header (available online at tools.ietforg/html/draft-previdi-6man-segment-routing-header-07), the entirety of which is incorporated herein by reference. A segment is encoded as an IPv6 address. An ordered list of segments is encoded as an ordered list of IPv6 addresses in the routing extension header. The segment to process at any point along the path through the network is indicated by a pointer in the routing extension header. Upon completion of a segment, the pointer is incremented. Segment Routing can also be applied to Ethernet, e.g., IEEE 802.1 and variants thereof. There are various benefits asserted for SR including, for example, scalable end-to-end policy, easy incorporation in IP and SDN architectures, operational simplicity, a balance between distributed intelligence, centralized optimization, and application-based policy creation, and the like.

Additionally, Segment Routing can include Traffic Engineering, such as described in Segment Routing Policy for Traffic Engineering draft-filsfils-spring-segment-routing-policy-04.txt (December 2017) (available online at tools.ietf org/html/draft-filsfils-spring-segment-routing-policy-04), the contents of which are incorporated by reference. Again, Segment Routing (SR) allows a headend node to steer a packet flow along any path. Intermediate per-flow states are eliminated thanks to source routing. The headend node is said to steer a flow into a Segment Routing Policy (SR Policy). The header of a packet steered in an SR Policy is augmented with the ordered list of segments associated with that SR Policy.

BRIEF SUMMARY OF THE DISCLOSURE

There is no known work on Segment Routing Traffic Engineering (SR-TE) based on link utilization, that is, under exhaustion/congestion determining new SR tunnels for new/existing services, and when underutilization was experienced then re-shuffling existing services to eliminate empty SR tunnels. One of the shortcomings of utilization-based SR-TE is that to perform globally optimal Traffic Engineering may require central intelligence such as an SDN Controller. It would be advantageous to enable utilization-based SR-TE without necessitating centralized control.

In an embodiment, a method for Segment Routing (SR) Traffic Engineering (SR-TE) in a network includes receiving link utilization measurements at a Label Edge Router (LER) with the link utilization measurements flooded by one or more Label Switch Routers (LSRs); and, responsive to one or more of detecting congestion and underutilization on one or more links associated with an SR tunnel at the LER based on the received link utilization measurements, performing one or more actions at the LER to one or more of alleviate the congestion and re-optimize the underutilization. The method can further include, responsive to detecting full utilization, determining a shortest SR tunnel that avoids fully utilized and/or congested links. A state of the SR tunnel is maintained only at the LER through a label stack assigned at the LER, wherein the label stack includes one or more of a node Segment ID (SID) and an adjacency SID. Segment IDs are flooded via Interior Gateway Protocol (IGP) and each node in the network determines shortest paths to every other node considering the link utilization measurements, wherein the one or more actions can include veering off a shortest path for the SR tunnel using the adjacency SID.

The link utilization measurements can be flooded via existing Interior Gateway Protocol (IGP) Traffic Engineering (TE) extensions with additional semantics to determine congestion. The congestion can be determined when maximum reservable bandwidth is greater than or equal to maximum bandwidth. Responsive to the LER detecting the congestion, the one or more actions can include discarding excess traffic on one or more services associated with the SR tunnel. Responsive to the LER detecting the congestion, the one or more actions can include determining another SR tunnel and moving the one or more services to the another SR tunnel. Responsive to the LER detecting the underutilization, the one or more actions can include moving one or more services to the SR tunnel and eliminating one or more other SR tunnels. The method can further include, responsive to detecting the congestion, implementing a timer set based on a distance between the LER and a congested link; and implementing the one or more actions subsequent to expiration of the timer if the congestion still remains. The link utilization measurements can be managed based on a plurality of service classes for prioritizing services over the SR tunnel.

In another embodiment, a Label Edge Router (LER) in a Segment Routing (SR) network configured to perform SR Traffic Engineering (SR-TE) includes circuitry configured to receive link utilization measurements with the link utilization measurements flooded by one or more Label Switch Routers (LSRs); and circuitry configured to perform one or more actions to one or more of alleviate congestion and re-optimize underutilization responsive to detection of one or more of the congestion and the underutilization on one or more links associated with an SR tunnel based on the received link utilization measurements. A state of the SR tunnel is maintained only at the LER through a label stack assigned at the LER, wherein the label stack includes one or more of a node Segment ID (SID) and an adjacency SID.

The link utilization measurements can be flooded via existing Interior Gateway Protocol (IGP) Traffic Engineering (TE) extensions with additional semantics to provide bandwidth utilization. Responsive to detection of the congestion, the one or more actions can include discarding excess traffic on one or more services associated with the SR tunnel. Responsive to detection of the congestion, the one or more actions can include determining another SR tunnel and moving the one or more services to the another SR tunnel. Responsive to detection of the underutilization, the one or more actions can include moving one or more services to the SR tunnel and eliminating one or more other SR tunnels. The LER can further include circuitry configured to implement a timer set based on a distance between the LER and a congested link responsive to the detection of the congestion, wherein the circuitry configured to perform the one or more actions performs the one or more actions subsequent to expiration of the timer if the congestion still remains. The link utilization measurements can be managed based on a plurality of service classes for prioritizing services over the SR tunnel.

In a further embodiment, a Label Switched Router (LSR) in a Segment Routing (SR) network configured to perform SR Traffic Engineering (SR-TE) includes circuitry configured to measure link utilization on adjacent links associated with the LSR; and circuitry configured to flood the measured link utilization to other nodes in the SR network utilizing existing Interior Gateway Protocol (IGP) Traffic Engineering (TE) extensions, wherein the flooded measured link utilization is utilized by one or more Label Edge Routers (LERs) to one or more of alleviate congestion and re-optimize underutilization on one or more SR tunnels.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
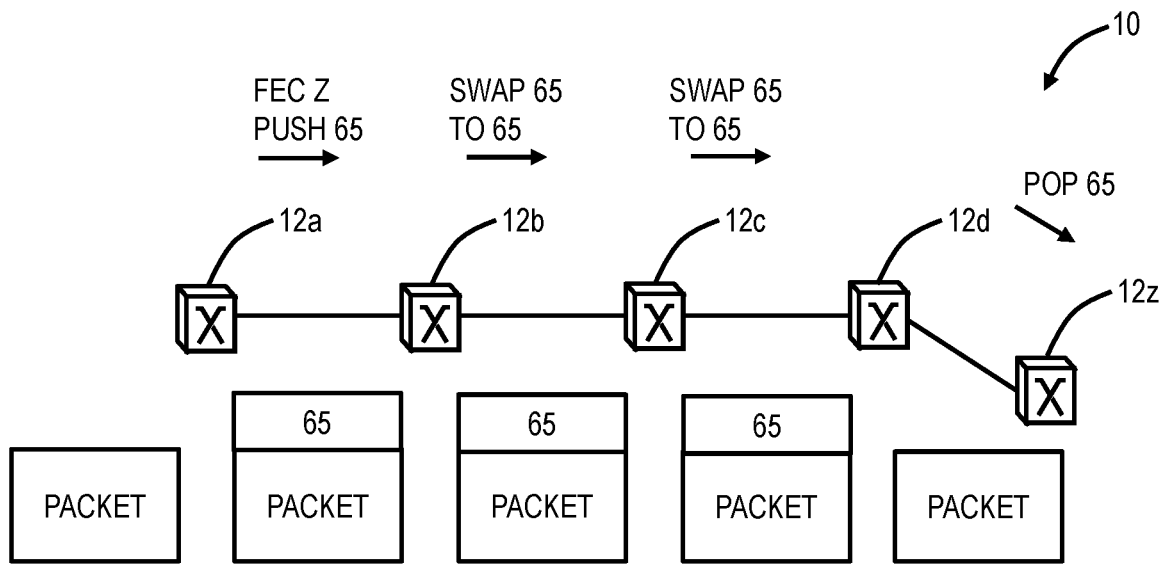
FIG. 1 is a network diagram of a Segment Routing (SR) network showing a node segment between the nodes.

The present disclosure relates to Segment Routing (SR) Traffic Engineering (SR-TE) based on link utilization to steer traffic when links are filled up or congested. Specifically, systems and methods are described which include routing extensions in SR to detect exhaustion and/or congestion. The systems and methods mimic routing decisions that are mainstream in MPLS-TE, Generalized MPLS (GMPLS), Optical Signal and Routing Protocol (OSRP) (from Ciena Corporation), etc. networks but are not possible in SR networks. That is, SR tunnels are not signaled and thus cannot be call admission controlled and routed in the network in the same manner as MPLS-TE, GMPLS, OSRP tunnels/connections are. Also, the routing extensions can be interpreted to determine that link congestion is present and permit reacting to such congestion by moving services to new or other SR tunnels. Similarly, when SR tunnels are underutilized then services can be moved from such tunnels and empty tunnels eliminated. This behavior is referred to as Traffic Engineering (TE), i.e., new SR tunnels are determined for new services or due to congestion along existing SR tunnels, and conversely, services are re-balanced when underutilization occurs, and empty SR tunnels eliminated from the network.

Note that terms "determined" and "eliminated" are used instead of "established" and "terminated" as with SR technology of source routing, SR tunnels are not signaled, and SR tunnel state is not maintained on any Label Switched Routers (LSRs) other than the ingress ones (Label Edge Routers (LERs)), and such SR tunnel state is reflected in the packet headers.

SR natively establishes an SR tunnel from a source (ingress) LSR to a destination (egress) LSR along a shortest path or paths in case of Equal-Cost Multi-Path (ECMP) routing, and all packets follow over such path(s). The shortest is from the perspective of a TE metric (cost, latency, distance, etc.). When the shortest path(s) get filled up or congested as more and more services, e.g., Pseudo Wires (PWs), are added to an SR tunnel then a need arises to determine another SR tunnel along a non-shortest path and future services bound to such SR tunnels. This is analogous to traditional distributed control planes, e.g., MPLS-TE or GMPLS, where tunnel Label Switched Paths (LSPs) are established, and potentially upsized based on utilization as PWs are added, along shortest paths until capacity along such paths is filled up or exhausted in which case additional tunnel LSPs are established along the next shortest paths. Similarly, OSRP routes its Subnetwork Connections (SNCs) along shortest paths, but when links run out of bandwidth along such paths, then OSRP will route subsequent SNCs on the next shortest paths.

In essence, the systems and methods attempt to mimic MPLS-TE, GMPLS, OSRP-like routing but in the context of SR. However, routing in SR is more complex than in MPLS-TE, GMPLS, OSRP, etc. as SR does not use a signaling protocol, i.e., SR tunnels are NOT signaled in the network, thus call admission control of SR tunnels onto links is not possible in the same manner as it is for MPLS-TE, GMPLS tunnels or OSRP SNCs. Due to the lack of a signaling protocol, the only recourse to steer SR tunnels is to either rely on centralized control approaches such as Software Defined Networking (SDN) to pre-determine SR tunnels and install their state on LERs or make distributed decisions based on link bandwidth utilization which is the approach described herein.

Note, in the case of congestion, if such congestion does not abate then there may be a need to move some existing services from the "shortest" SR tunnels to the "next-shortest" ones. This also implies that when the "shortest" SR tunnels become underutilized when services are removed from the network, then existing services need to be moved from the "next-shortest" SR tunnels to the "shortest" ones and potentially the "next-shortest" SR tunnels are eliminated.

The systems and methods rely on existing routing extension in SR to detect exhaustion and/or congestion as follows. That is, existing extensions have to be extended with additional semantics such as a negative Unreserved Bandwidth. Ingress LSRs maintain service (e.g., PW) assignment to SR tunnel and maintain service utilization. Preferably, services can also indicate the expected bandwidth usage but this is strictly not required, and the expected bandwidth usage may be used by ingress LSRs to determine which services may be "misbehaving" and thus causing congestion and to determine which SR tunnel such services should be assigned to, without waiting for potential congestion to occur.

LSRs can be configured to measure link utilization and flood it via Interior Gateway Protocol (IGP) with TE Extensions (such as OSPF-TE (RFC3630), ISIS-TE, etc.). The receiving nodes apply the following logic. For a first option:

the maximum reservable bandwidth is greater than
the maximum bandwidth—If (Unreserved
Bandwidth<(Maximum Reservable Bandwidth−
Maximum Bandwidth)) then Congestion
Bandwidth=Maximum Reservable Bandwidth−
Unreserved Bandwidth.

For a second option:
the maximum reservable bandwidth is equal to the maximum bandwidth—If (Unreserved Bandwidth<0) then Congestion Bandwidth=AbsoluteValue(Unreserved Bandwidth).

In the foregoing examples, the second option is used for the ease of illustration, but the first option is more likely for implementation as negative Unreserved Bandwidth implies congestion.

When exhaustion is detected then new services are routed over new SR tunnels and when congestion is detected some existing services can be moved to new or other existing SR tunnels. When underutilization is detected, services can be moved between SR tunnels and empty SR tunnels eliminated.

In an embodiment, the systems and methods can be operated in a distributed fashion and thus serve as a backup mechanism to a globally optimal mechanism of SDN. That is, the distributed mechanism can automatically route SR traffic to eliminated/avoid congestion and await SDN instructions to optimize the network bandwidth usage.

Segment Routing Overview

FIGS. 1-4 are network diagrams illustrate Segment Routing (SR) through a network 10. The network 10 includes nodes 12a, 12b, 12c, 12d, 12m, 12n, 12o, 12p, 12z. Segment Routing (SR) enables any node to select any path (explicit or derived from the Interior Gateway Protocol's (IGP) destination-based Shortest Path Tree (SPT) computations) for each flow. The path does not depend on a hop-by-hop signaling technique (neither Label Distribution Protocol (LDP) nor Resource Reservation Protocol (RSVP)). It only depends on a set of "segments" that are advertised by the IS-IS routing protocol. These segments act as topological sub-paths that can be combined together to form the desired path.

Figure 2:
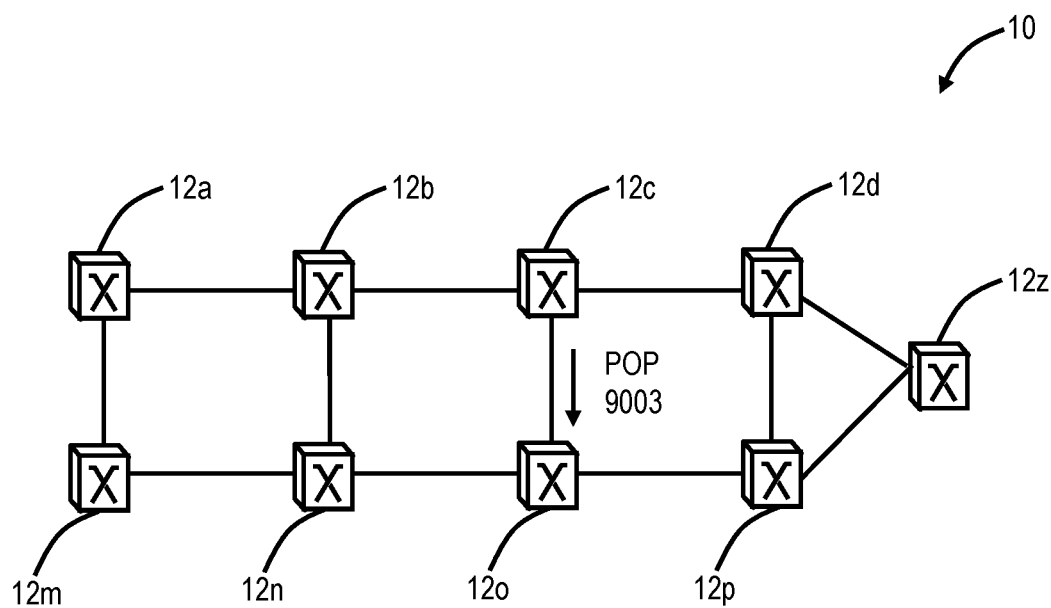
FIG. 2 is a network diagram of the SR network showing an adjacency segment between two nodes.

There are two fundamental forms of segments in Segment Routing: node and adjacency. FIG. 1 illustrates the network 10 showing a node segment between the nodes 12a, 12b, 12c, 12d, 12z. A node segment represents the shortest path to a node. A node segment is typically a multi-hop shortest path. In FIG. 1, a packet is being sent to the node 12z, i.e., a Forward Equivalency Class (FEC) Z, and a packet injected anywhere with a top label of "65" will reach the node 12z via the shortest path. In FIG. 1, Penultimate Hop Popping (PHP) is enabled on the final link. FIG. 2 illustrates the network 10 showing an adjacency segment between the nodes 12c, 12o. An adjacency segment represents a specific adjacency to a node. For example, the node 12c allocates a local label, e.g., "9003", the node 12c advertises the adjacency label "9003" in IS-IS, e.g., via a simple sub-Type Length Value (TLV) extension, and the node 12c is the only node to install the adjacency segment in its forwarding table for use by the data plane. Thus, a packet injected at the node 12c with a label "9003" is forced through the link between the nodes 12c, 12o. The adjacency segment can be used when laying down Traffic Engineering trunks.

Figure 3:
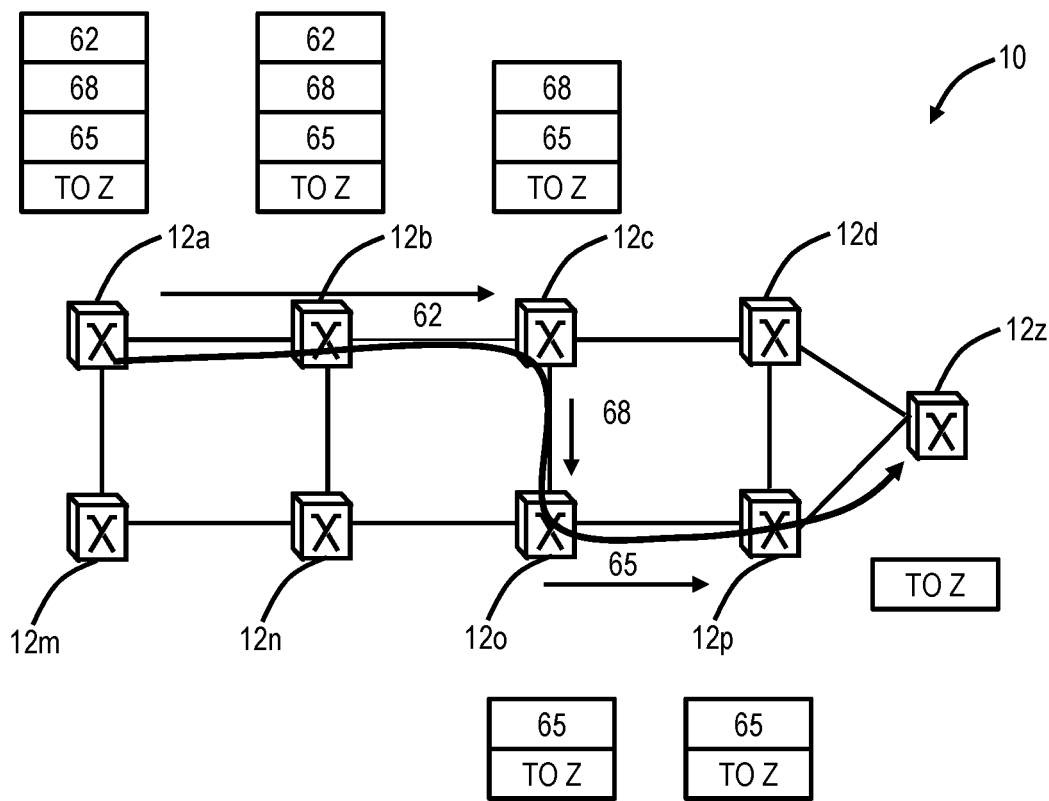
FIG. 3 is a network diagram of the SR network showing a combination of node segments and adjacency segments for combined segments.

FIG. 3 illustrates the network 10 showing a combination of node segments and adjacency segments for combined segments. Segment Routing uses node segments primarily with adjacency segments used for traffic engineering. That is, SR includes two types of Segment IDs (SIDs)—node SIDs and adjacency SIDs. In the MPLS context, SIDs equate to MPLS labels. In FIG. 3, a packet destined for the node 12z is injected at the node 12a, labels are added at the node 12a as "65" for a node segment to the node 12z, "68" for an adjacency segment between the nodes 12c, 12o, and "62" for a node segment to the node 12c. The label stacks are shown in FIG. 3 represent the stack transmitted on the egress port of the associated switch. At the node 12c, the label "62" is popped (assuming Penultimate Hop Popping is disabled) and the label "68" is seen, so the packet takes the adjacency segment between the nodes 12c, 12o. At the node 12o, the label "68" is popped and the label "65" is seen for the node segment to the node 12z. At the node 12z, the label "65" is popped revealing the packet destined for the node 12z.

Figure 4:
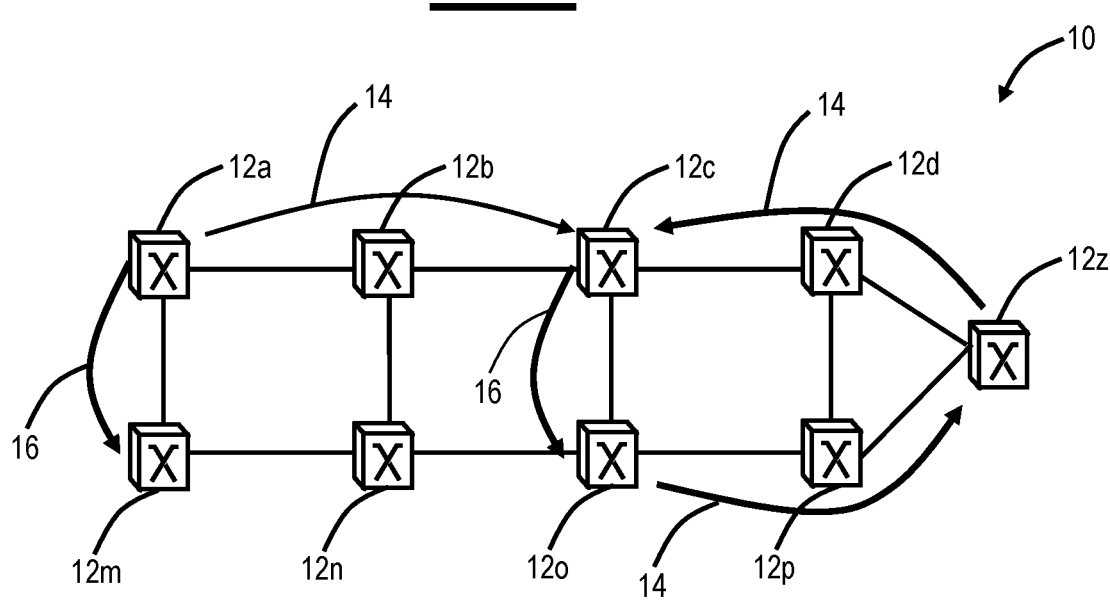
FIG. 4 is a network diagram of the SR network showing Intermediate System to Intermediate System (IS-IS) flooding and installation of segments in Segment Routing.

FIG. 4 illustrates the network 10 showing IS-IS flooding and installation of segments in Segment Routing. For example, FIG. 4 includes node segments 14 and adjacency segments 16 that are flooded and automatically installed by IS-IS. The node and adjacency SIDs are flooded via IGP (e.g., OSPF, IS-IS) and by default, each node in the network computes shortest paths to every other node and programs the data path, and the data path define the SR tunnels. By pushing a node SID (label) onto a packet, such packet can be forwarded along the shortest path to the node that originated such node SID. The adjacency SIDs (labels) can be used to veer off of the shortest path. A single label or multiple labels (label stack) defining an SR tunnel only needs to be present on ingress LSRs (LERs) of such tunnels. There is zero SR tunnel state in the middle of the network on transit LSRs. The tunnel state is only on ingress LERs and also in packets in the form of label stack (of depth 1, 2, etc.).

Of note, Segment Routing has an excellent scale with each of the nodes 12 installing N+A Forwarding Information Base (FIB) entries where N is the number of nodes in the domain, and A is a number of adjacency segments attached to each node. Each node 12 in the network 10 scales efficiently, e.g., much more than RSVP-TE. The state is located in each packet, not in the router. Scaling is on the order of N+A labels per node versus MPLS running RSVP-TE, which requires a total of N^2 paths to be signaled for a full mesh of point-to-point connections, of which a significant fraction will require state on each core router.

SR originated through a desire to simplify network operations including provisioning, management, and troubleshooting. SR originated to solve the scalability and complexity issues plaguing the MPLS control plane, i.e., mainly signaling (Label Distribution Protocol (LDP)/RSVP-TE).

SR-TE Based on Link Utilization

Figure 5:
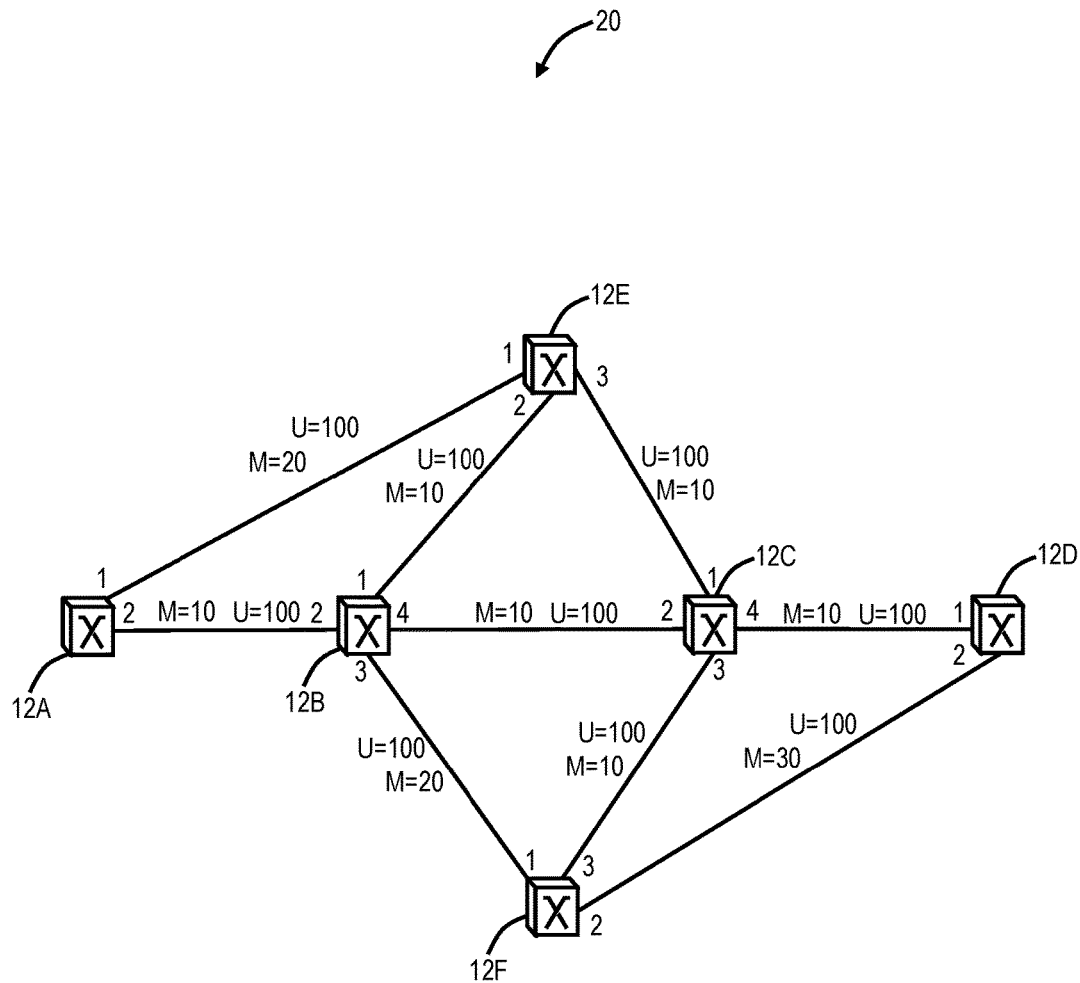
FIG. 5 is a network diagram of a network of various nodes for illustrating the SR-Traffic Engineering (TE) systems and methods.

FIG. 5 is a network diagram of a network 20 of various nodes 12A-12F for illustrating the SR-TE systems and methods. The nodes 12A-12F can be classified either as an LSR or LER. The LSR performs routing based only on the label and is an intermediate node for an SR tunnel. The LER (also can be referred to as an ingress or egress LSR) operates at the ingress or egress of the SR tunnel.

Again, the SR-TE systems and methods include the ingress LSRs (LERs) maintaining service (e.g., PW) assignments to SR tunnels and the service utilization. All LSRs measure link utilization and flood it via IGP with TE Extensions, such as using RFC3630 "Traffic Engineering (TE) Extensions to OSPF Version 2," September 2003, or RFC5307 "IS-IS Extensions in Support of Generalized Multi-Protocol Label Switching (GMPLS)," October 2008, the contents of each is incorporated by reference herein. Thus, each node 12A-12F has visibility of SR tunnel utilization. With this flooded utilization data, each node 12A-12F can determine which SR tunnels are congested, fully utilized, underutilized, etc.

Again, two options for determining congested bandwidth include—

Option 1: Maximum Reservable Bandwidth is greater than Maximum Bandwidth:

If (Unreserved Bandwidth<(Maximum Reservable Bandwidth−Maximum Bandwidth)) then

Congestion Bandwidth=Maximum Reservable Bandwidth−Unreserved Bandwidth

Option 2: Maximum Reservable Bandwidth is equal to Maximum Bandwidth:

If (Unreserved Bandwidth<0) then

Congestion Bandwidth=AbsoluteValue(Unreserved Bandwidth)

In FIG. 5, there are node SIDs of A, B, C, D, E, F and adjacency SIDs of 1, 2, 3, 4. All of the LSR nodes for each SR tunnel are configured to flood utilization which is shown, for example, in FIG. 5 as values M=X where M is the link TE metric for each link and associated SR tunnel over that link, and U=Y where U is the unreserved/unused bandwidth of Y. The value of Y is a variable of bandwidth value that can change over time based on the current link utilization. M=X reflects the link TE Metric which does not typically change over time and may refer to Distance, Cost, Latency of a link. Both M=X and U=Y are used to determine shortest paths. Here, in FIG. 5, all of the links are showing U=100 and varying values of M such as 10, 20, or 30.

Figure 6:
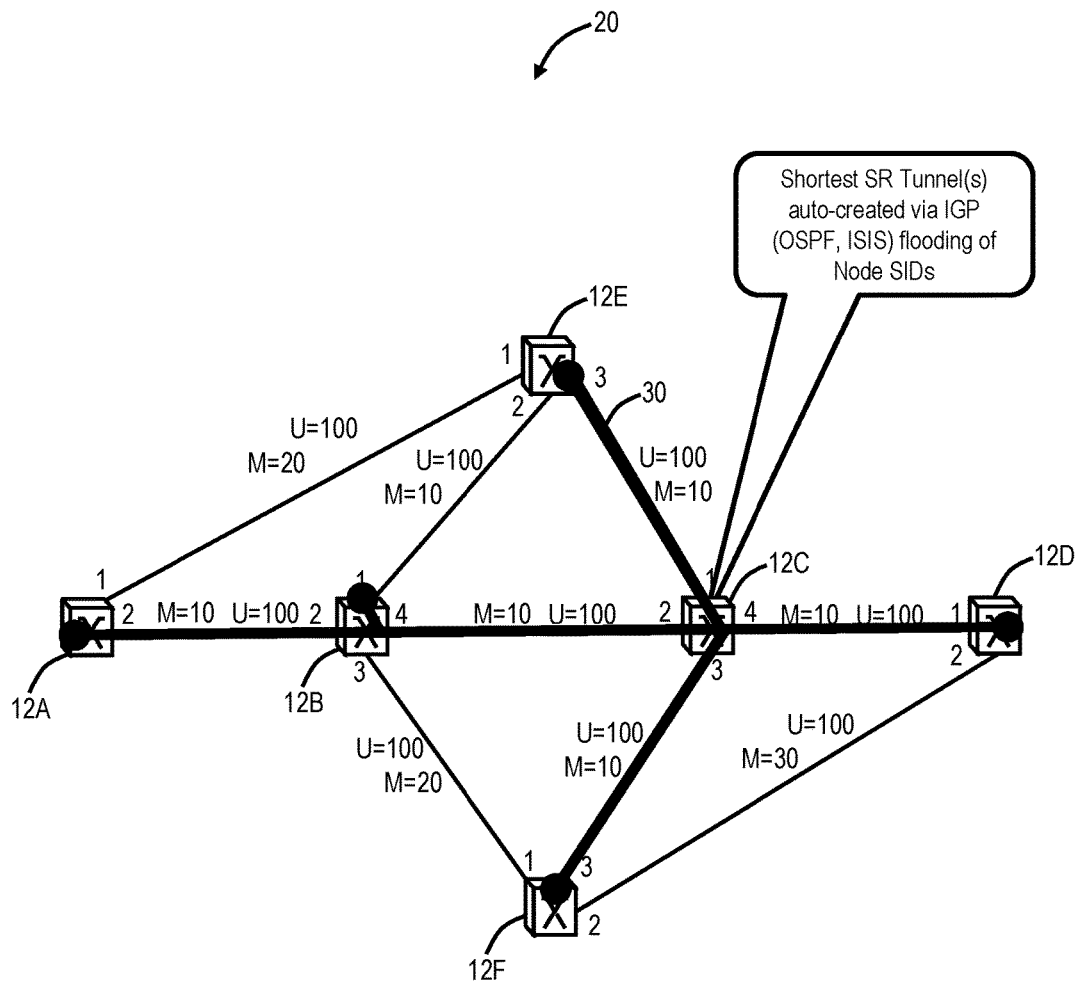
FIG. 6 is a network diagram of the network illustrating shortest SR tunnels to a node D.
Figure 7:
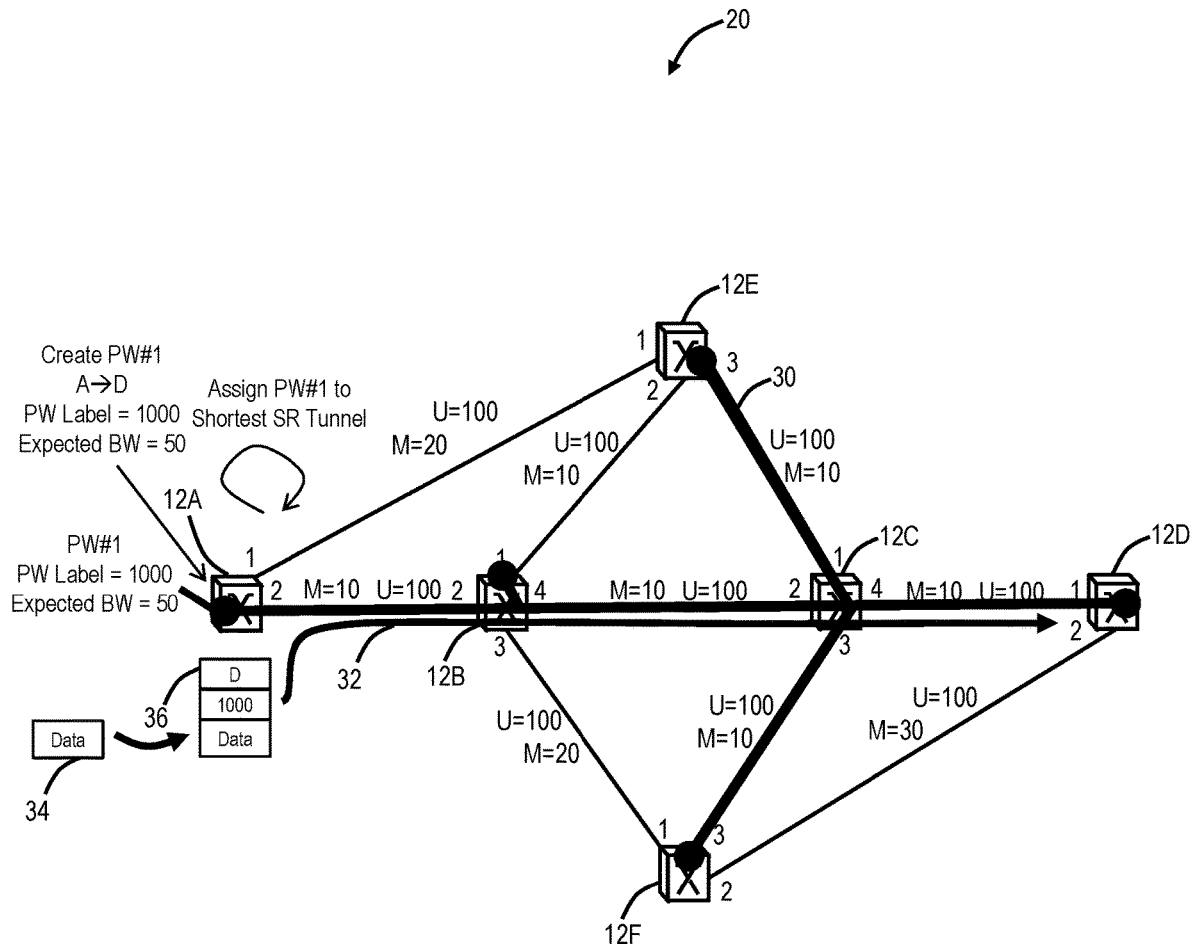
FIG. 7 is a network diagram of the network illustrating the creation of a first Pseudo Wire (PW #1) between a node A as the ingress Label Switched Router (LSR) and the node D as the egress LSR.
Figure 8:
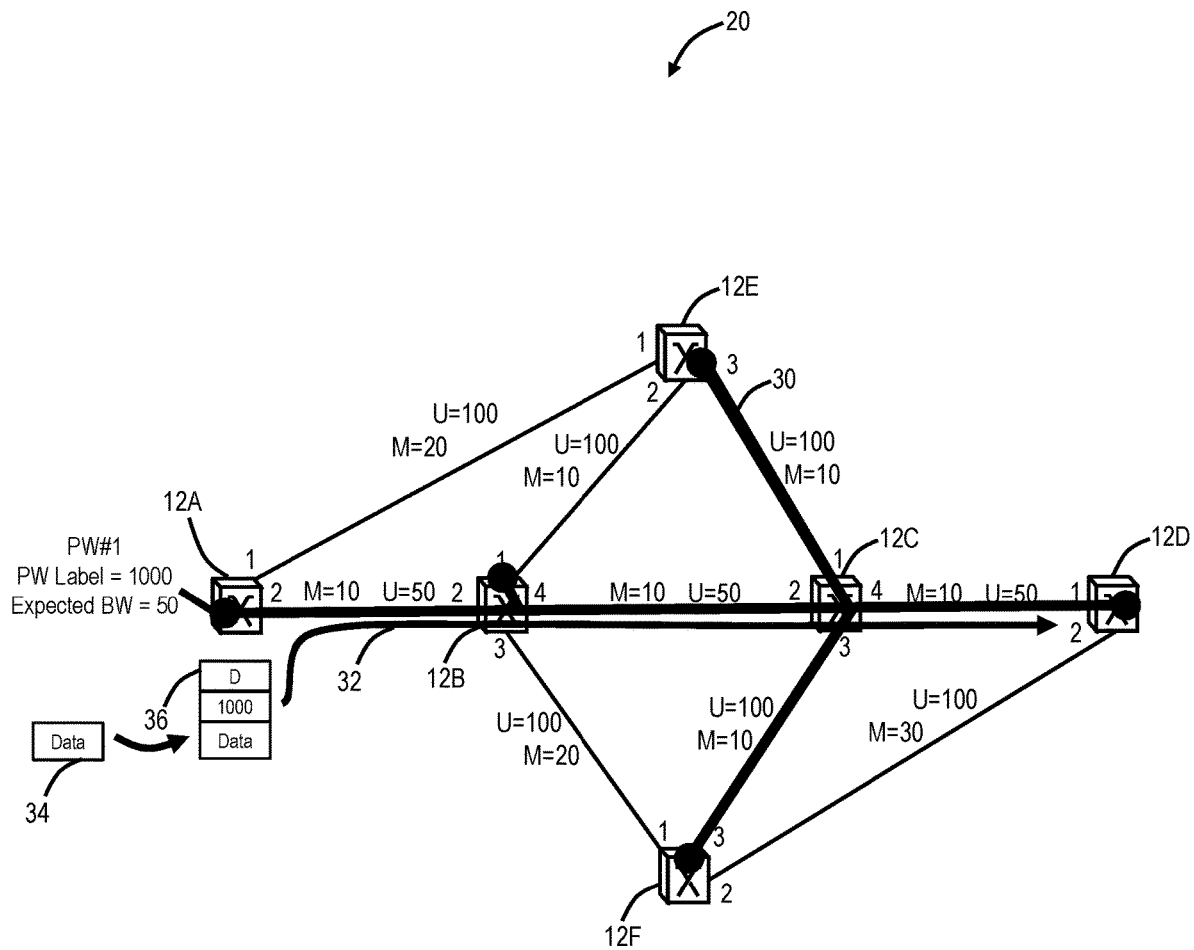
FIG. 8 is a network diagram of the network illustrating link utilization measurements and flooding subsequently to the creation and operation of the PW #1.

FIG. 6 is a network diagram of the network 20 illustrating shortest SR tunnels 30 to node 12D. The shortest SR tunnels 30 are auto-created via IGP flooding of the node SIDs. FIG. 7 is a network diagram of the network 20 illustrating the creation of a first Pseudo Wire (PW #1) 32 between the node 12A as the ingress LSR and node 12D as the egress LSR. For example, the PW #1 32 is created designating the ingress LSR as the node 12A, and the egress LSR as the node 12D, a PW label of 1000 is assigned, and optionally an expected bandwidth is provided of 50. The node 12A assigns the PW #1 32 to the shortest SR tunnel 30 to node 12D which in this case is from the node 12A to the node 12B to the node 12C to the node 12D. With U=100 on each of the physical inks, PW #1 32 with the expected bandwidth of 50 can be supported. Once created, data 34 for the PW #1 32 is provided to the SR tunnel 30 with a label stack 36 with a node SID D and a PW label 1000. FIG. 8 is a network diagram of the network 20 illustrating link utilization measurements and flooding subsequently to the creation and operation of the PW #1 32. As can be seen in FIG. 8, U=50 on all of the links between the nodes 12A, 12B, 12C, 12D due to the PW #1 32.

Figure 9:
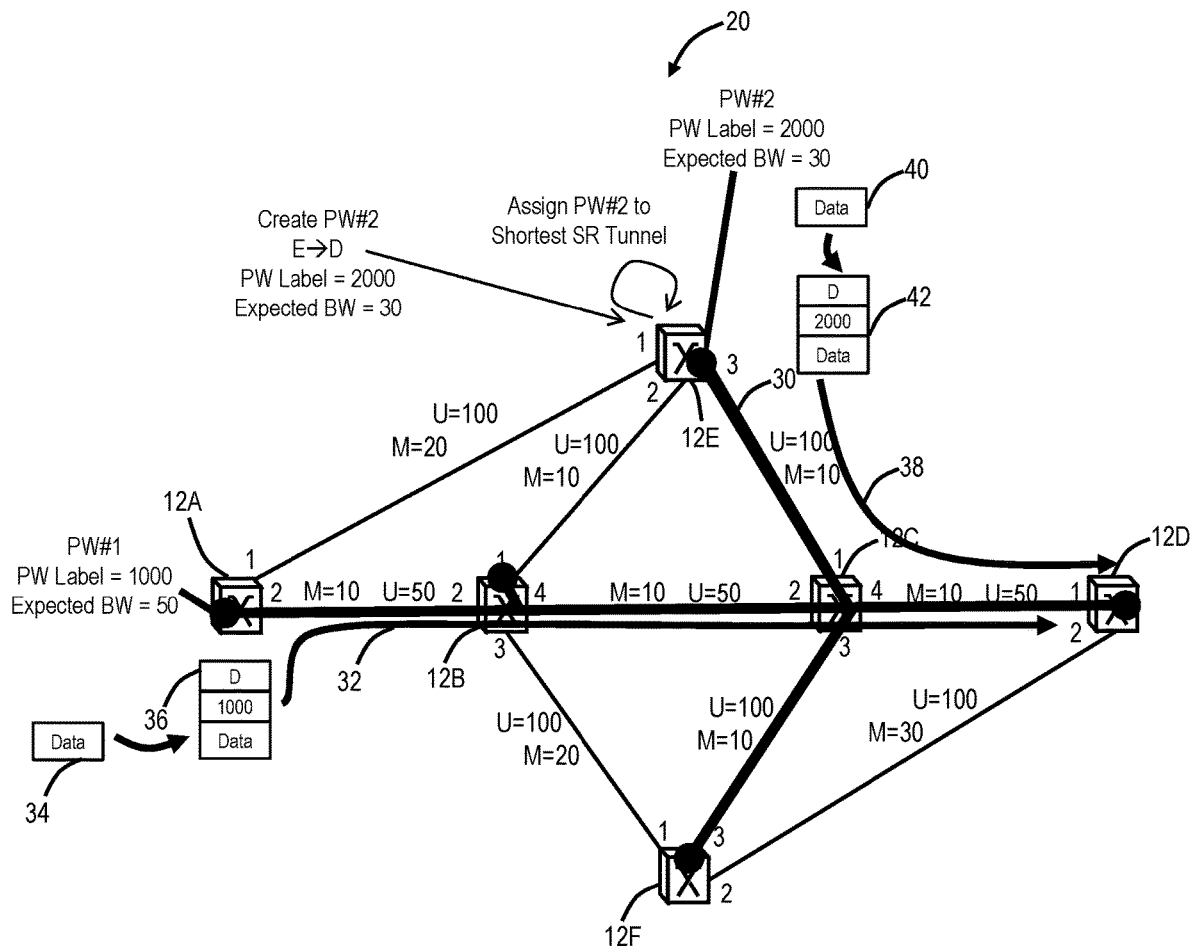
FIG. 9 is a network diagram of the network illustrating creation of a second Pseudo Wire (PW #2) between the node E as the ingress LSR and node D as the egress LSR.
Figure 10:
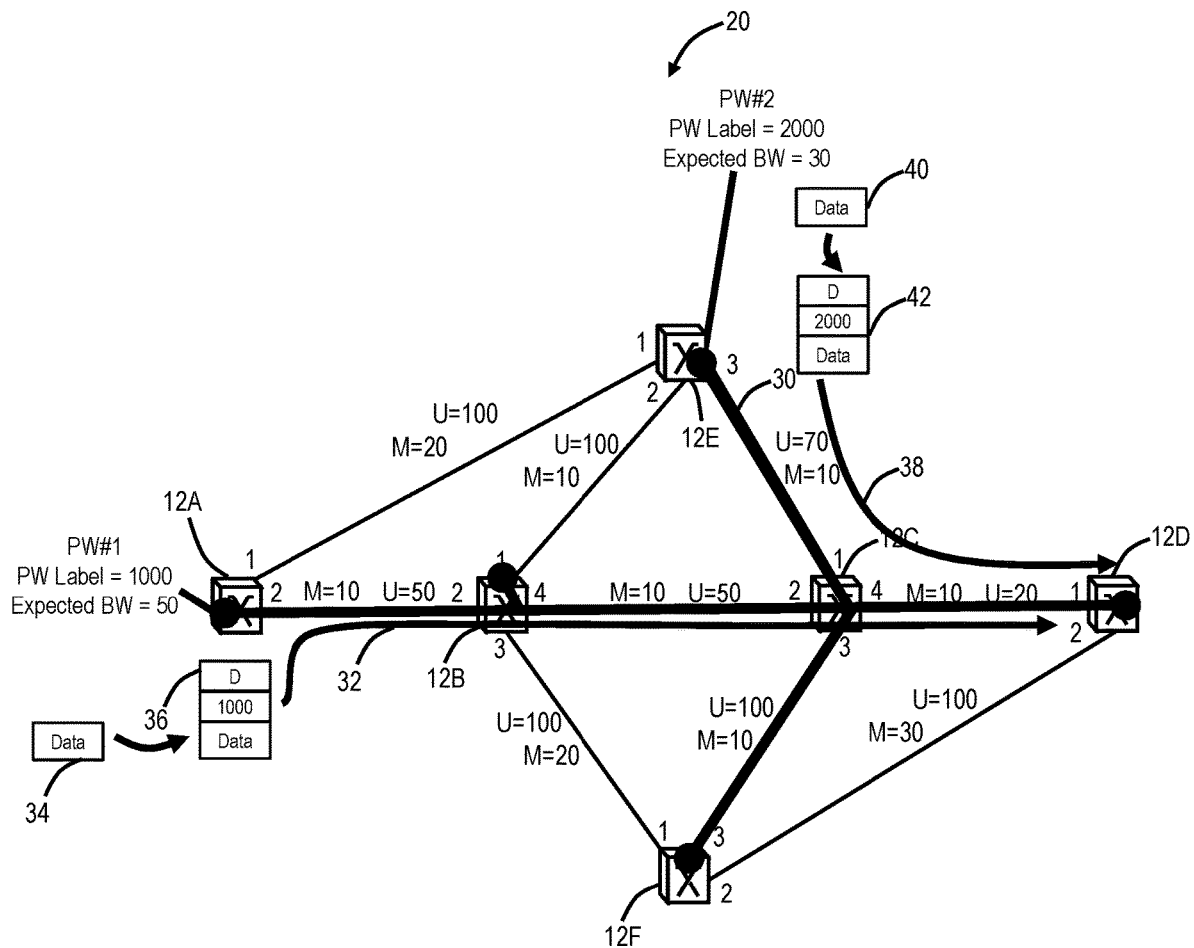
FIG. 10 is a network diagram of the network illustrating link utilization measurements and flooding subsequently to the creation and operation of the PW #2.

FIG. 9 is a network diagram of the network 20 illustrating creation of a second Pseudo Wire (PW #2) 38 between the node 12E as the ingress LSR and node 12D as the egress LSR. For example, the PW #2 38 is created designating the ingress LSR as the node 12E, and the egress LSR as the node 12D, a PW label of 2000 is assigned, and optionally an expected bandwidth is provided of 30. The node 12E assigns the PW #2 38 to the shortest SR tunnel 30 to node 12D which in this case is from the node 12E to the node 12C to the node 12D. This is because U=100 or 50 on each of these links, thus the PW #2 38 with the expected bandwidth of 30 can be supported. Once created, data 40 for the PW #2 38 is provided to the SR tunnel 30 with a label stack 42 with a node SID D and a PW label 2000. FIG. 10 is a network diagram of the network 20 illustrating link utilization measurements and flooding subsequently to the creation and operation of the PW #2 38. As can be seen in FIG. 10, U=50, 70, or 20 on the links associated with the PW #1 32 and the PW #2 38.

Figure 11:
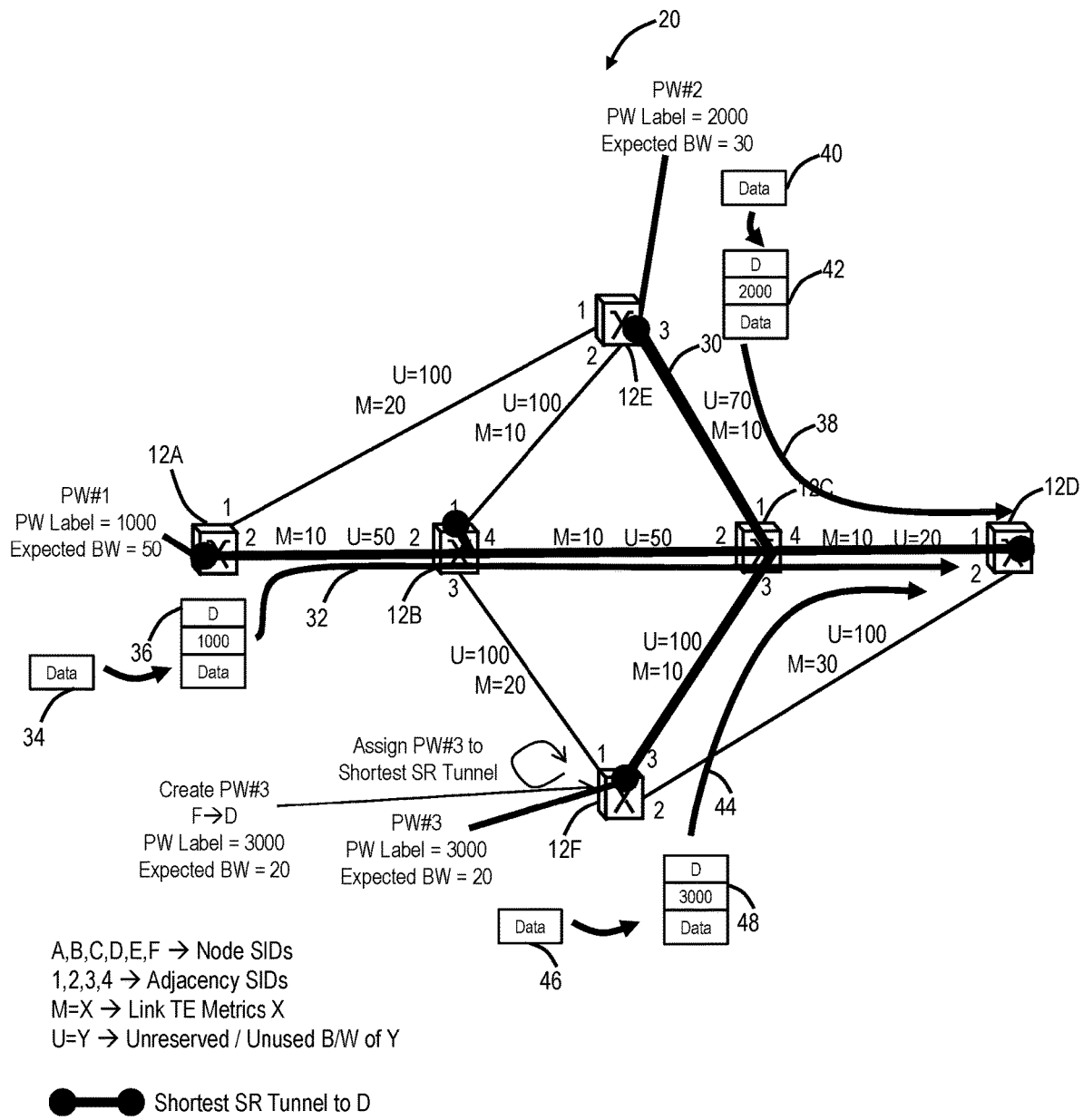
FIG. 11 is a network diagram of the network illustrating the creation of a third Pseudo Wire (PW #3) between the node F as the ingress LSR and node D as the egress LSR.
Figure 12:
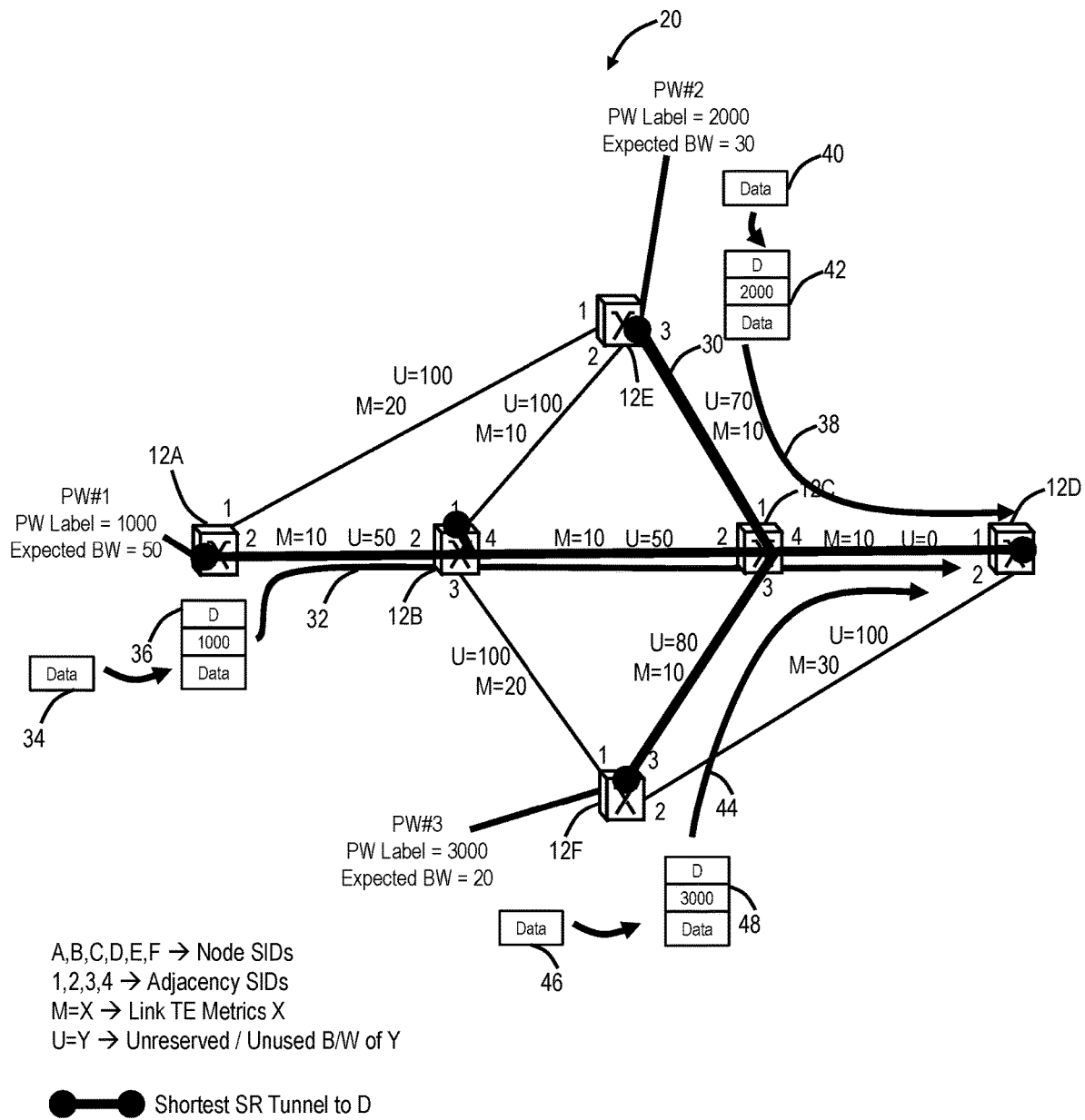
FIG. 12 is a network diagram of the network illustrating link utilization measurements and flooding subsequently to the creation and operation of the PW #3.

FIG. 11 is a network diagram of the network 20 illustrating creation of a third Pseudo Wire (PW #3) 44 between the node 12F as the ingress LSR and node 12D as the egress LSR. For example, the PW #3 44 is created designating the ingress LSR as the node 12F, and the egress LSR as the node 12D, a PW label of 3000 is assigned, and optionally an expected bandwidth is provided of 20. The node 12F assigns the PW #3 44 to the shortest SR tunnel 30 to node 12D which in this case is from the node 12F to the node 12C to the node 12D. This is because U=100 or 20 on each of these links, thus the PW #3 44 with the expected bandwidth of 20 can be supported. Once created, data 46 for the PW #3 44 is provided to the SR tunnel 30 with a label stack 48 with a node SID D and a PW label 3000. FIG. 12 is a network diagram of the network 20 illustrating link utilization measurements and flooding subsequently to the creation and operation of the PW #3 44. As can be seen in FIG. 12, U=50, 70, 80 or 0 on the links associated with the PW #1 32, the PW #2 38, and the PW #3 44. Specifically, the link between the nodes 12C, 12D is now fully utilized, i.e., zero unreserved/unused bandwidth.

Figure 13:
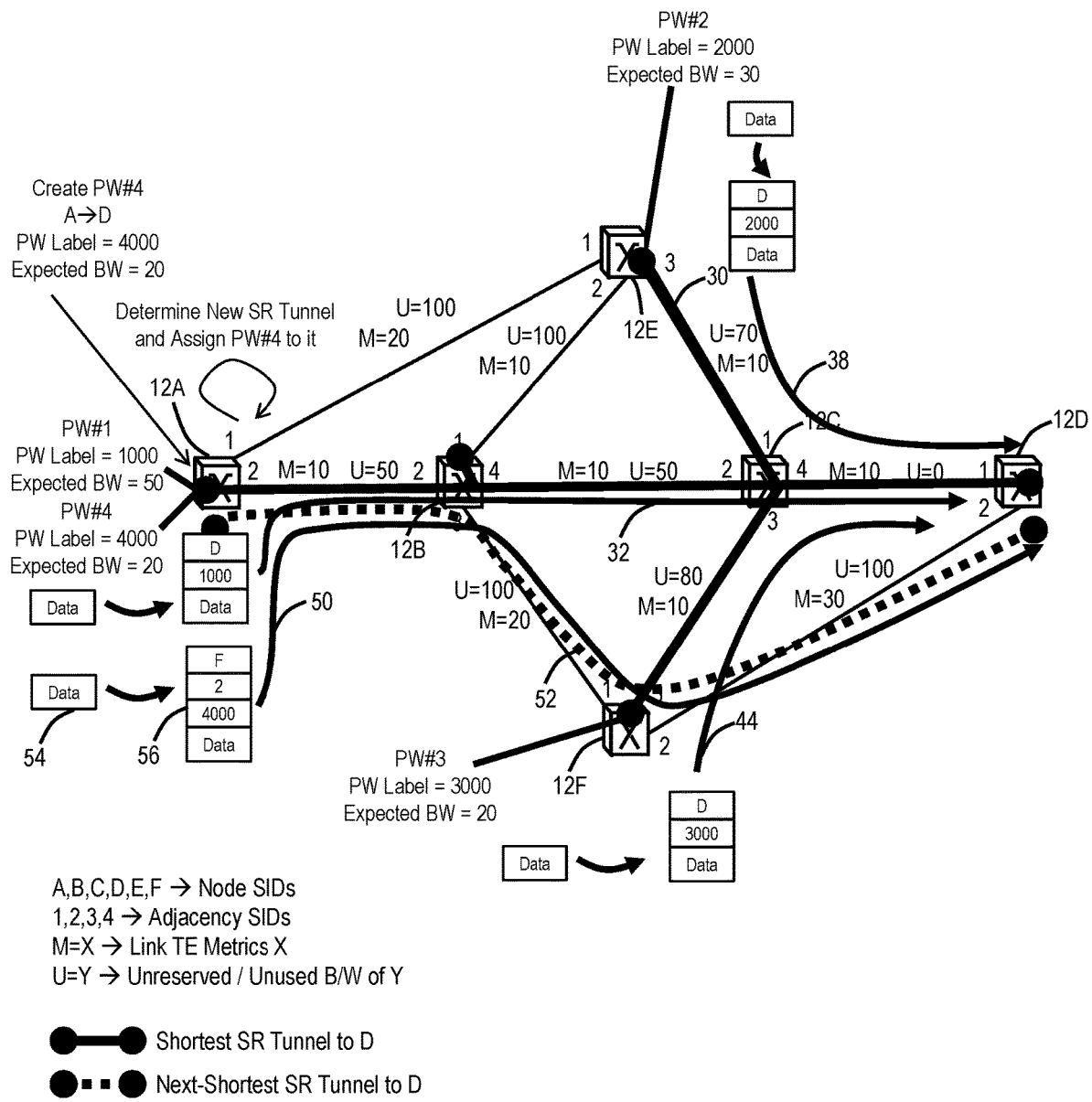
FIG. 13 is a network diagram of the network illustrating creation of a fourth Pseudo Wire (PW #4) between the node A as the ingress LSR and node D as the egress LSR.

FIG. 13 is a network diagram of the network 20 illustrating the creation of a fourth Pseudo Wire (PW #4) 50 between the node 12A as the ingress LSR and node 12D as the egress LSR. For example, the PW #4 50 is created designating the ingress LSR as the node 12A, and the egress LSR as the node 12D, a PW label of 4000 is assigned, and optionally an expected bandwidth is provided of 20. The node 12A has knowledge based on the flooding of link utilization associated with the PW #1 32, the PW #2 38, and the PW #3 44 that the SR tunnel 30 to the node 12D is fully utilized (on the link between the nodes 12C, 12D, i.e., U=0). Accordingly, the node 12A determines that a new SR tunnel 52 is required to the node 12D for the PW #4 50, i.e., the SR tunnel 52 is the next-shortest SR tunnel to the node 12D. The node 12A assigns the PW #4 50 to the next-shortest SR tunnel 52 to node 12D which in this case is from the node 12A to the node 12B to the node 12F to the node 12D. This is because U=100 or 50 on each of these links, thus the PW #4 50 with the expected bandwidth of 20 can be supported. Once created, data 54 for the PW #4 50 is provided to the SR tunnel 52 with a label stack 56 with a node SID F, an adjacency SID 2 (to steer along the SR tunnel 52), and a PW label 4000.

Figure 14:
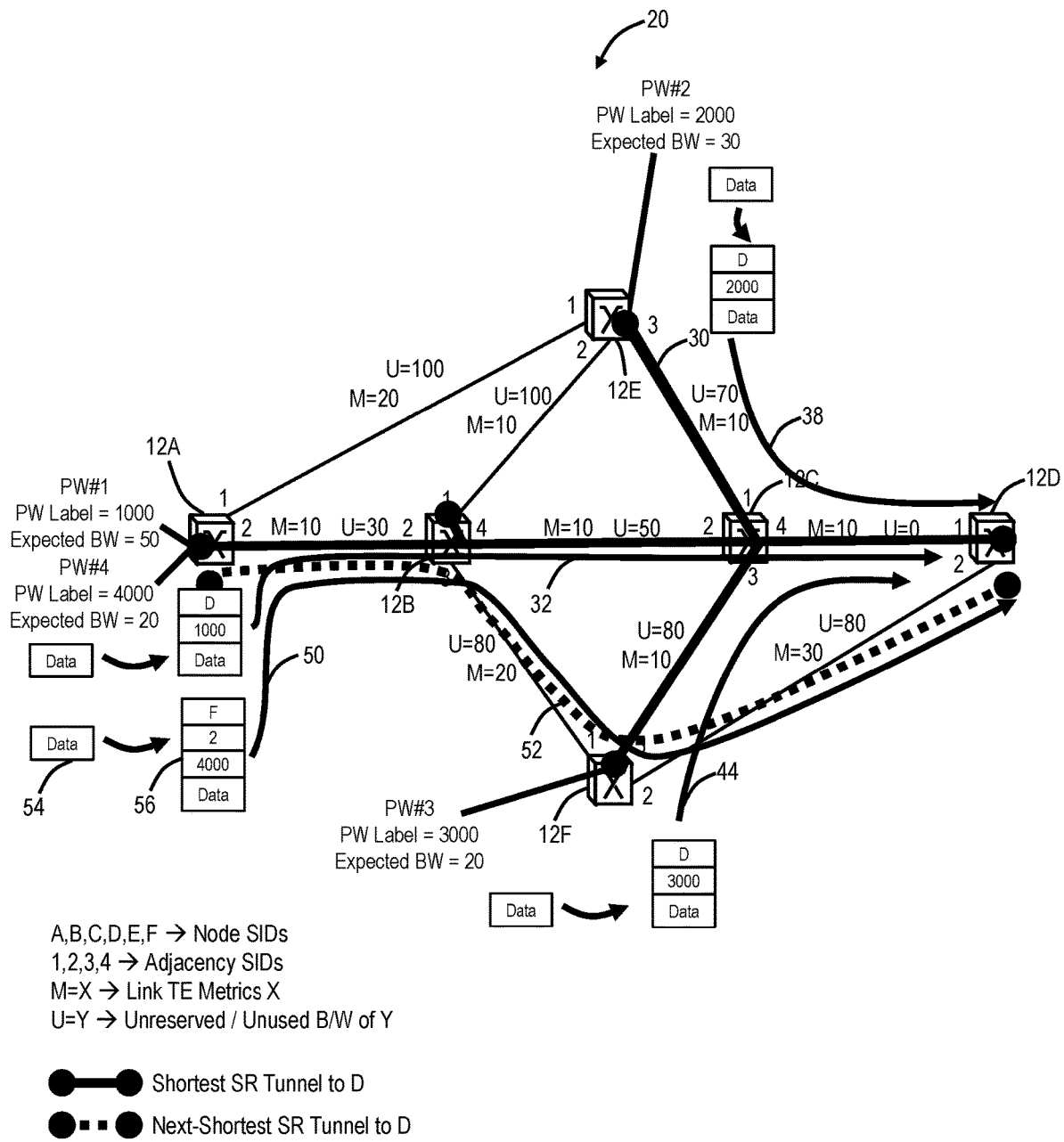
FIG. 14 is a network diagram of the network illustrating link utilization measurements and flooding subsequently to the creation and operation of the PW #4 on the next-shortest SR tunnel.

FIG. 14 is a network diagram of the network 20 illustrating link utilization measurements and flooding subsequently to the creation and operation of the PW #4 50 on the next-shortest SR tunnel 52. As can be seen in FIG. 14, U=0, 30, 50, 70, or 80 on the links associated with the PW #1 32, the PW #2 38, the PW #3 44, and the PW #4 50. Again, the link between the nodes 12C, 12D is still fully utilized.

Figure 15:
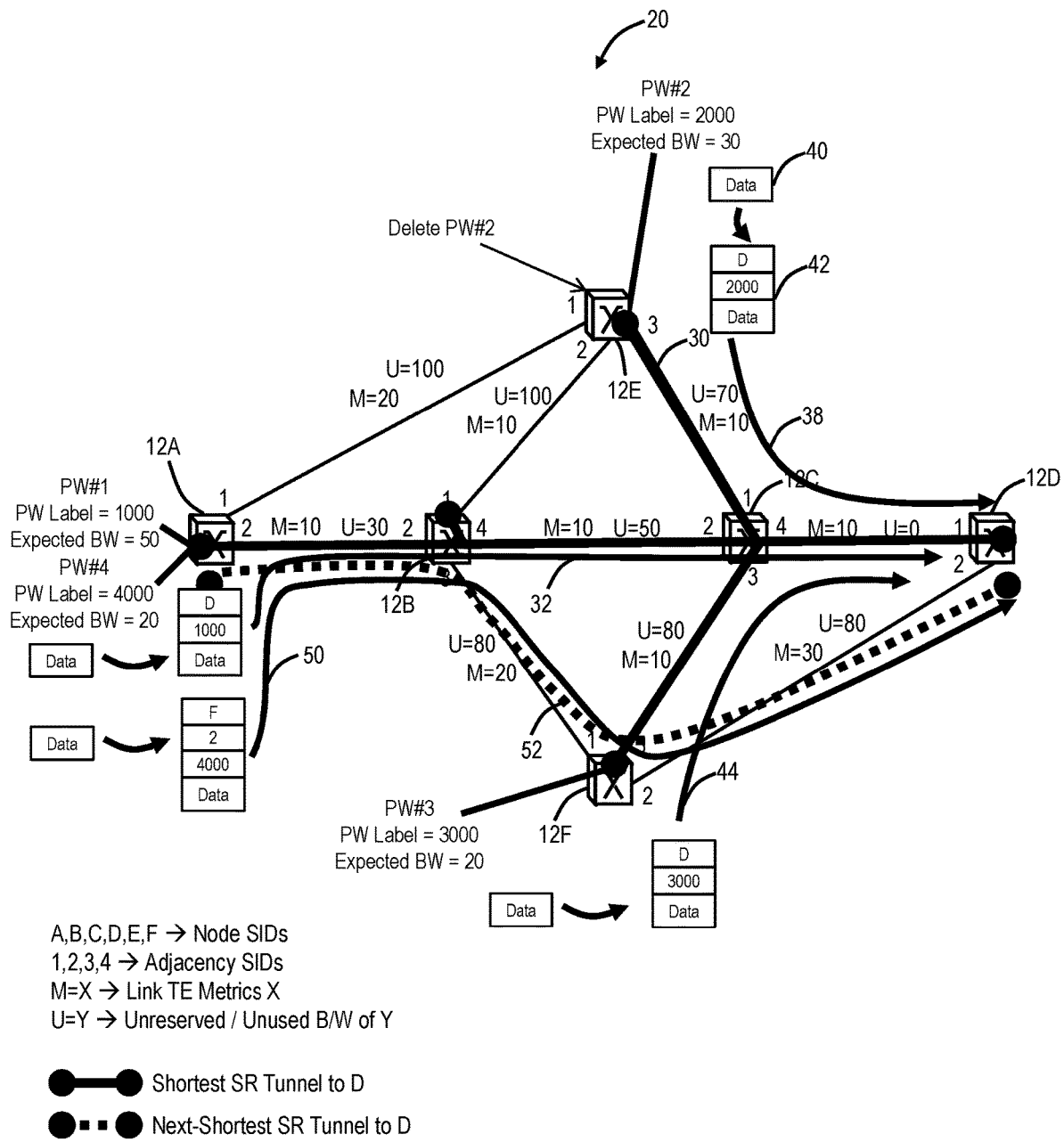
FIG. 15 is a network diagram of the network illustrating deletion of the PW #2.
Figure 16:
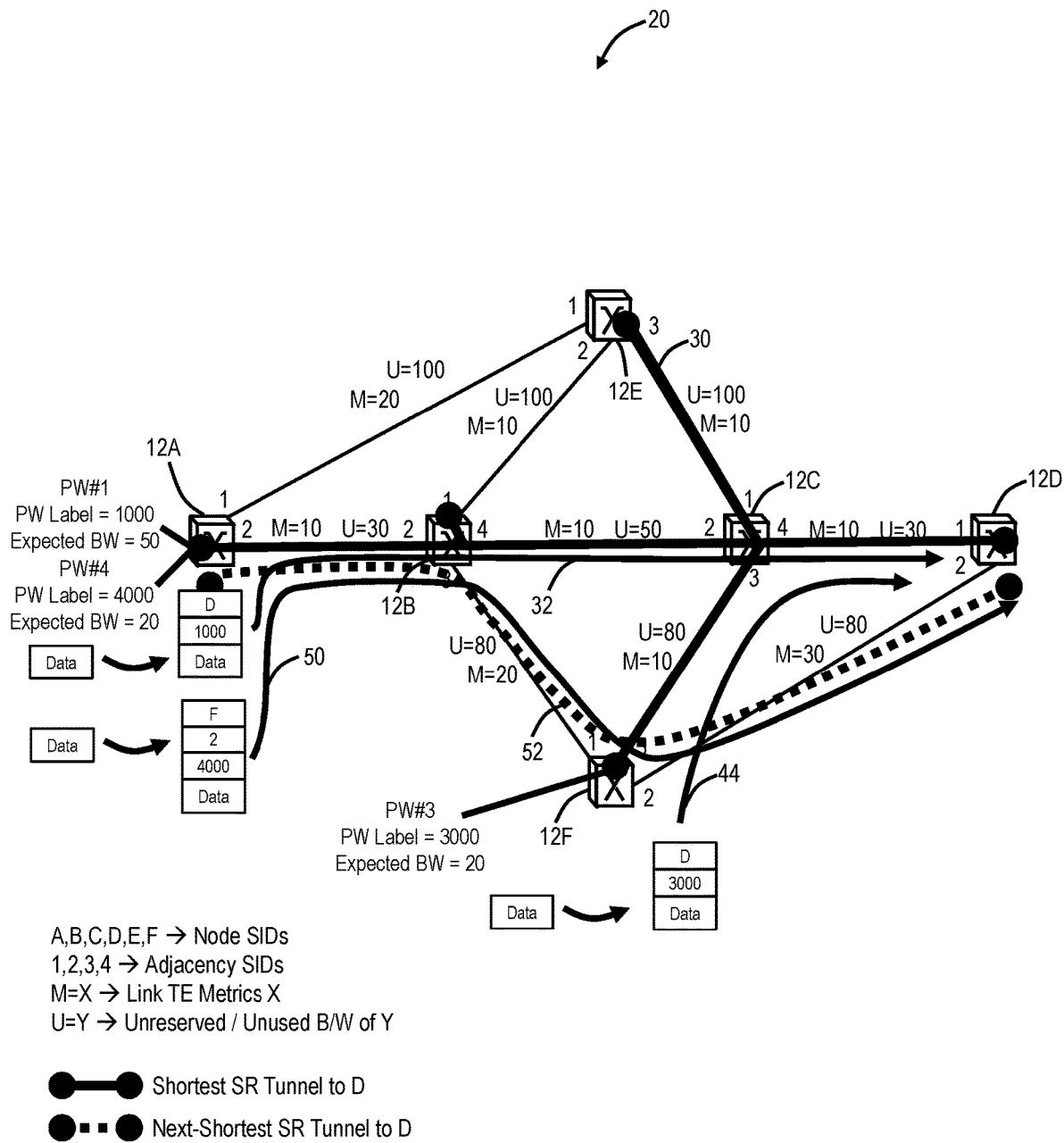
FIG. 16 is a network diagram of the network illustrating link utilization measurements and flooding subsequently to the deletion of the PW #2 on the shortest SR tunnel.

FIG. 15 is a network diagram of the network 20 illustrating deletion of the PW #2 38. A request is received at the node 12E to delete the PW #2 38, and the node 12E deletes the PW #2 38. FIG. 16 is a network diagram of the network 20 illustrating link utilization measurements and flooding subsequently to the deletion of the PW #2 38 on the shortest SR tunnel 30. Note, at this point, the link between the nodes 12C, 12D is no longer fully utilized, i.e., U=30.

Figure 17:
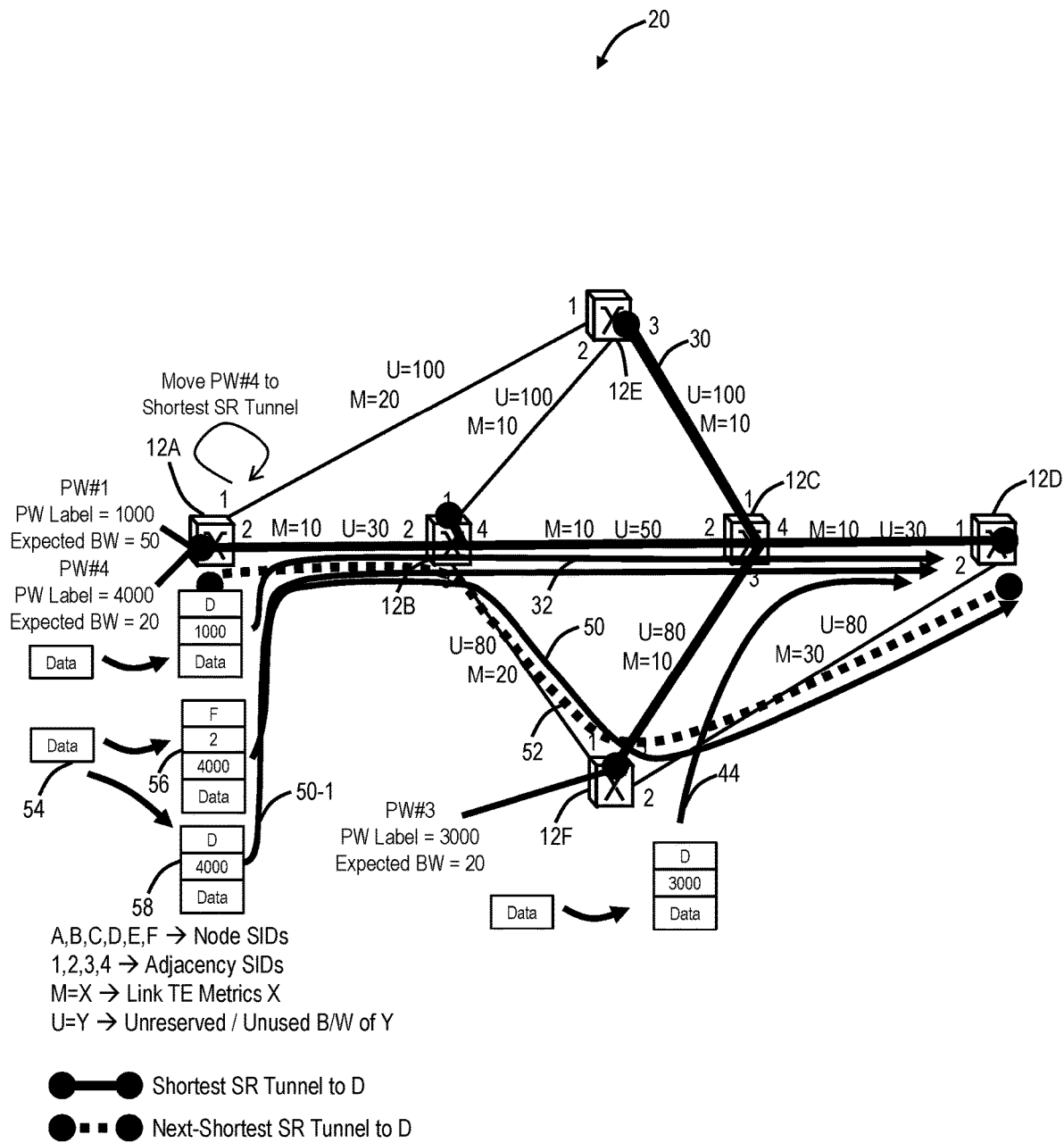
FIG. 17 is a network diagram of the network illustrating re-optimization of the PW #4 subsequent to the deletion of the PW #2.
Figure 18:
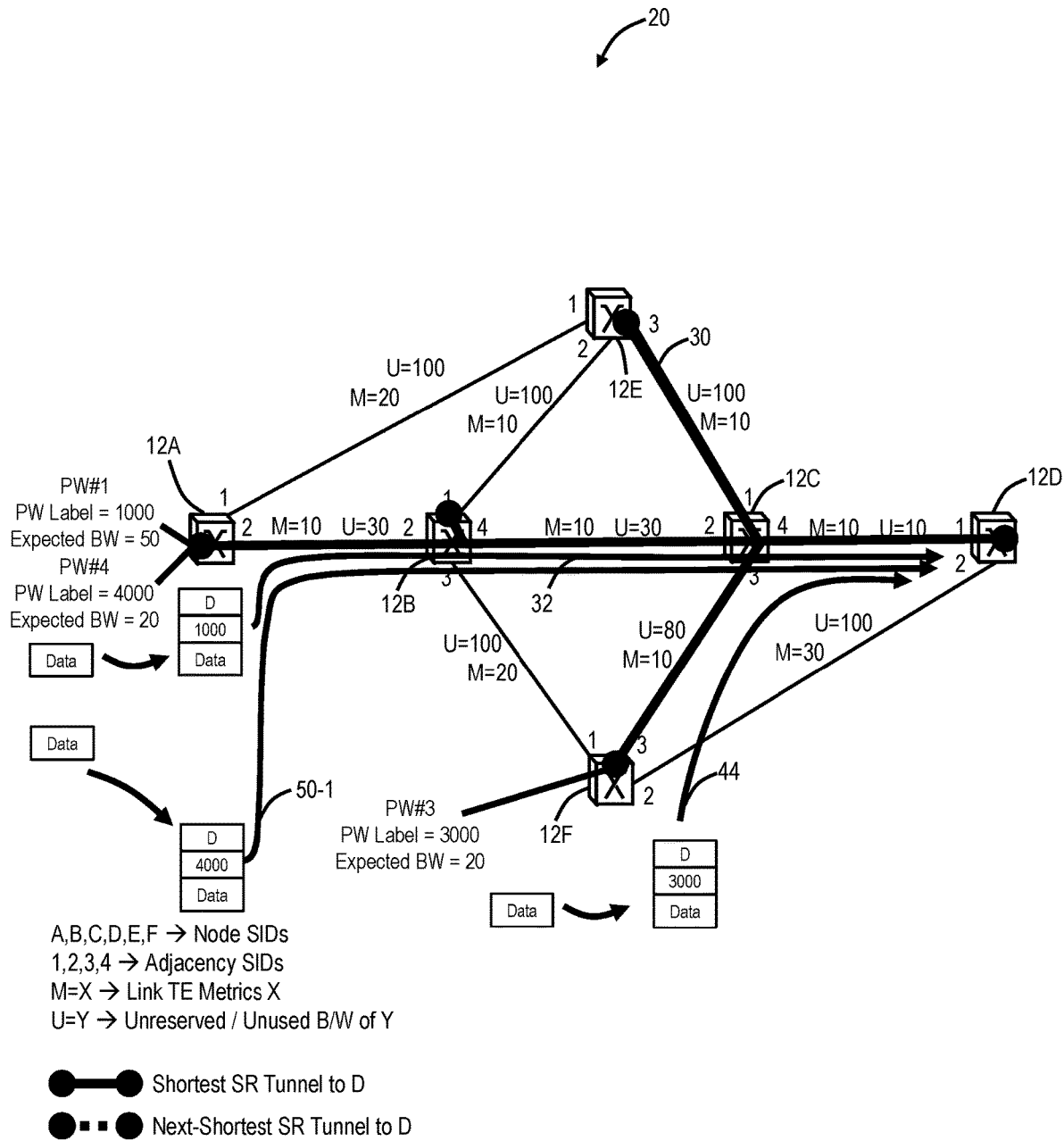
FIG. 18 is a network diagram of the network illustrating link utilization measurements and flooding subsequently to the re-optimization of the PW #4 on the shortest SR tunnel.

FIG. 17 is a network diagram of the network 20 illustrating re-optimization of the PW #4 50 subsequent to the deletion of the PW #2 38. After the flooding in FIG. 16, the node 12A can now determine the shortest SR tunnel 30 to the node 12D is underutilized, i.e., U=30. Thus, there is no longer a need to provide the PW #4 50 on the next-shortest SR tunnel 52 as it can be supported on the shortest SR tunnel 30. The node 12A moves the PW #4 50 from the next-shortest SR tunnel 52 to the shortest SR tunnel 30 by providing the data 54 with a new label stack 58 with a node SID D and a PW label of 4000 such that a PW #4 50-1 now is over the shortest SR tunnel 30. FIG. 18 is a network diagram of the network 20 illustrating link utilization measurements and flooding subsequently to the re-optimization of the PW #4 50-1 on the shortest SR tunnel 30. The non-shortest SR tunnel is thus eliminated after PW #4 was moved to the shortest SR tunnel.

Link Congestion

The foregoing examples in FIGS. 5-18 assume the expected bandwidth usage was provided up front and was maintained. In practice, the expected bandwidth usage can be exceeded, or it may not have been provided. To that end, there are three cases to consider—

Case 1 includes services (e.g., PWs) indicate the expected bandwidth usage when configured, but are sending more traffic than indicated and the excess traffic is marked as discardable (e.g., Yellow) at the ingress LSR.

Case 2 includes services (e.g., PWs) indicate the expected bandwidth usage when configured, but are sending more traffic than indicated and the excess traffic is not marked as discardable (e.g., Yellow) at the ingress LSR.

Case 3 includes services (e.g., PWs) that did not indicate the expected bandwidth usage when configured, but there is now link congestion occurring at an LSR.

For Case 1, the discardable (e.g., Yellow) traffic can be discarded at the congested link by the associated LSR. A policy can be defined as (1) at LSRs, whether to report in the flooding via the routing extensions as congestion bandwidth when discardable traffic is being discarded, (2) at the ingress LSR (LER), whether to react to routing reports of congestion bandwidth that discardable traffic is being discarded, and (3) the reaction policies for the ingress LSR (LER) can be (i) do nothing, (ii) drop excess traffic causing congestion, or (iii) move the services/PWs to alternate tunnels/paths.

For Case 2, non-discardable (e.g., Green) traffic is being discarded at the congested link by the associated LSR, i.e., because there is no traffic marked as discardable and there is excess traffic. Such congestion can always be reported in the flooding via the routing extensions as congestion bandwidth by the associated LSR. The ingress LSR (LER) policies can include (i) do nothing or (ii) move the services/PWs to alternate tunnels/paths.

For Case 3, non-discardable (e.g., Green) traffic is being discarded at the congested link by the associated LSR. Such congestion can always be reported in the flooding via the routing extensions as congestion bandwidth by the associated LSR. The ingress LSR (LER) policies can include (i) do nothing or (ii) move the services/PWs to alternate tunnels/paths.

Based on the three cases and associated policies, there can be four scenarios to consider as follows. In Scenario 1, the LSR does not report congested bandwidth thus the ingress LSR (LER) does not react to congestion. In Scenario 2, the associated LSRs report congested bandwidth and the ingress LSR (LER) does nothing. In Scenario 3, the associated LSRs report congested bandwidth and the ingress LSR (LER) discards excess traffic. Finally, in Scenario 4, the associated LSRs report congested bandwidth and the ingress LSR (LER) moves the services/PWs to alternate tunnels/paths.

Figure 19:
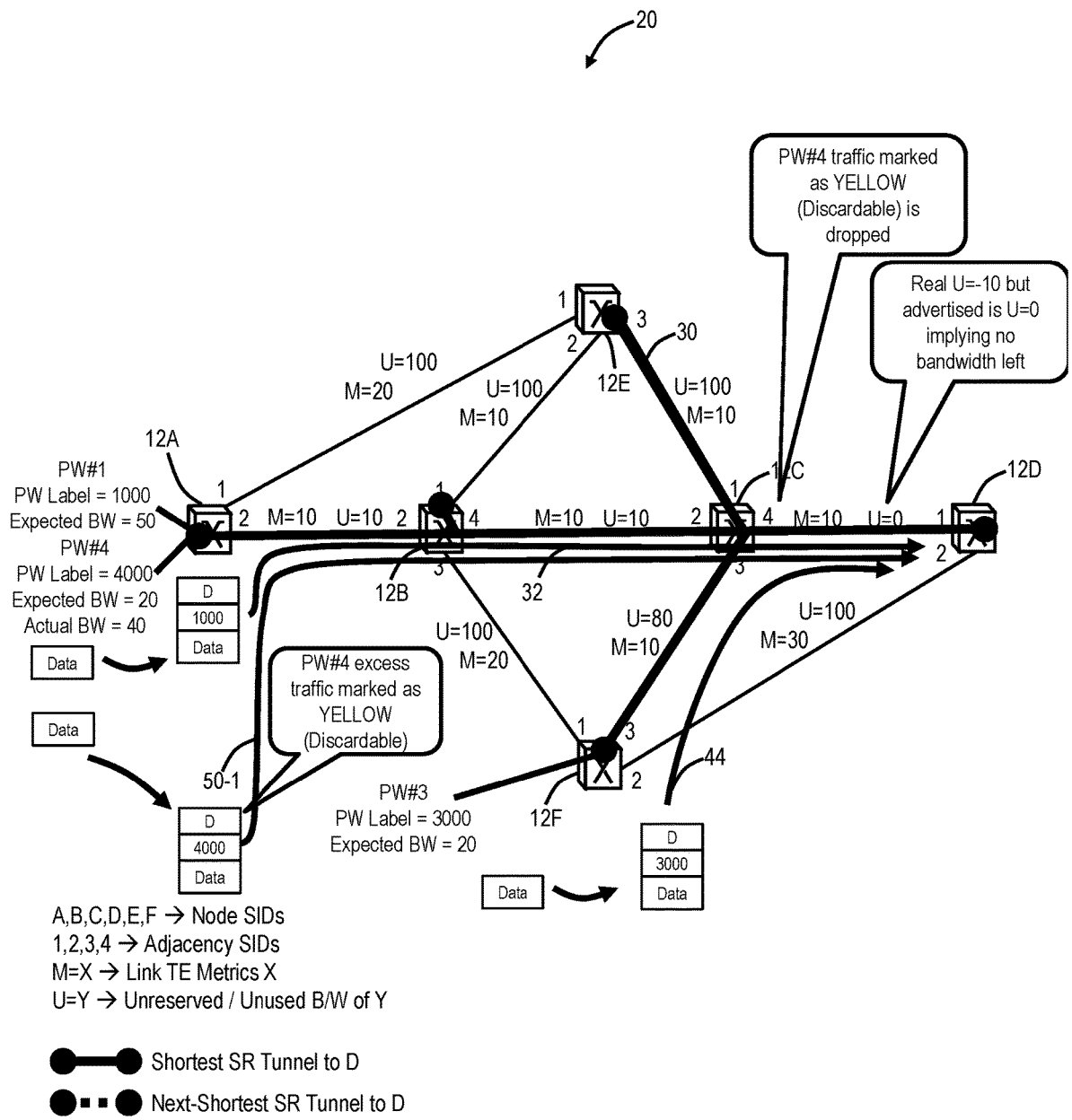
FIG. 19 is a network diagram of the network illustrating the Scenario 1 where the LSR does not report congested bandwidth thus the ingress LSR does not react to congestion.

FIG. 19 is a network diagram of the network 20 illustrating the Scenario 1 where the LSR does not report congested bandwidth thus the ingress LSR does not react to congestion. Here, the PW #4 50-1 over the shortest SR tunnel 30 has an expected bandwidth of 20, but an actual bandwidth of 40 with excess traffic marked as discardable (e.g., Yellow). The excess traffic is discarded by the node 12C (LSR) but the utilization on the link between the nodes 12C, 12D is advertised as U=0 even though the real utilization is U=−10.

Figure 20:
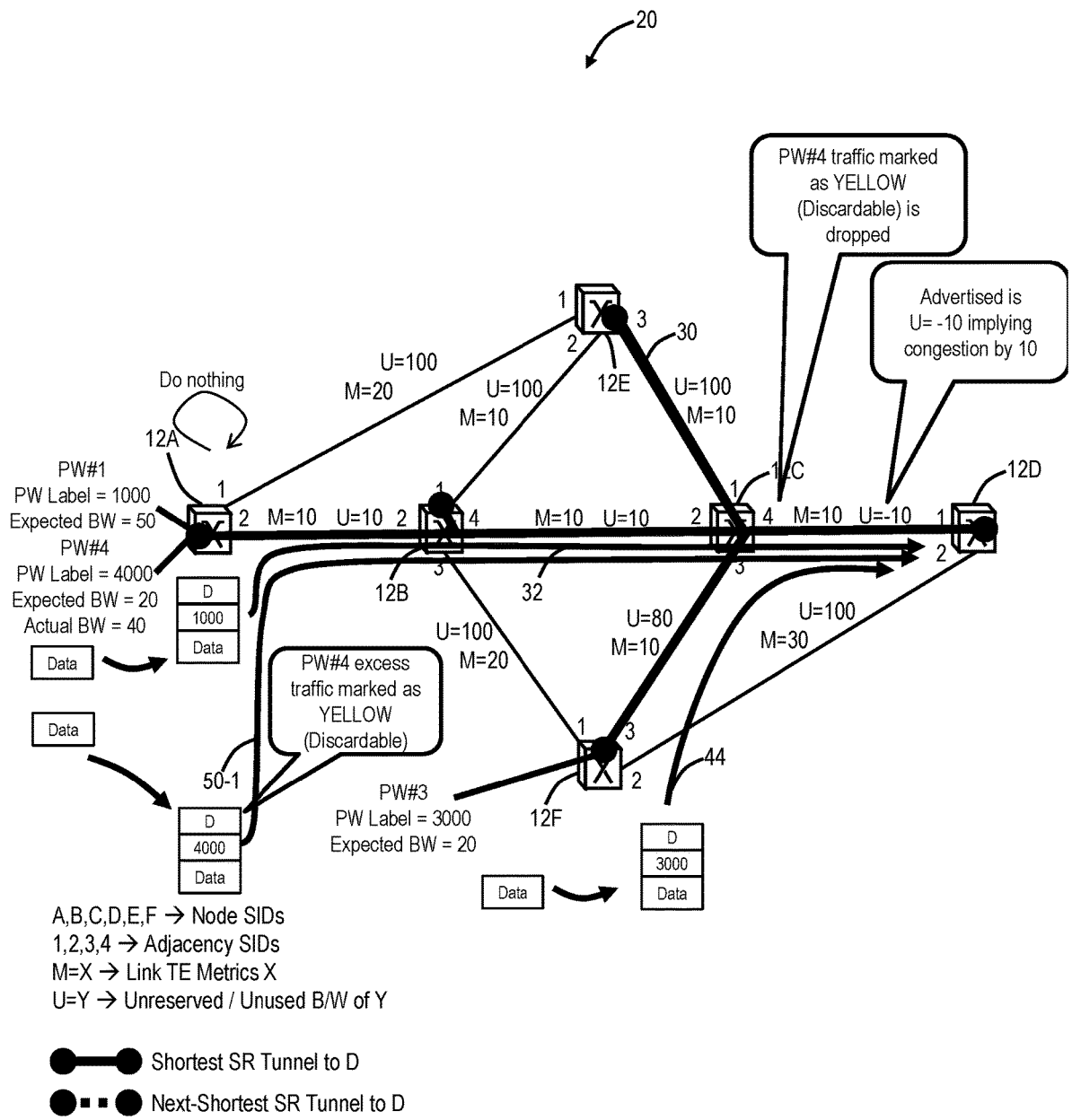
FIG. 20 is a network diagram of the network illustrating the Scenario 2 where the LSR reports congested bandwidth and the ingress LSR does nothing.

FIG. 20 is a network diagram of the network 20 illustrating the Scenario 2 where the LSR reports congested bandwidth and the ingress LSR does nothing. Here, similar to FIG. 19, the PW #4 50-1 over the shortest SR tunnel 30 has an expected bandwidth of 20, but an actual bandwidth of 40 with excess traffic marked as discardable (e.g., Yellow). The excess traffic is discarded by the node 12C (LSR). The utilization on the link between the nodes 12C, 12D is advertised as U=−10 implying congestion by 10. However, the node 12A (ingress LSR) takes no action.

Figure 21:
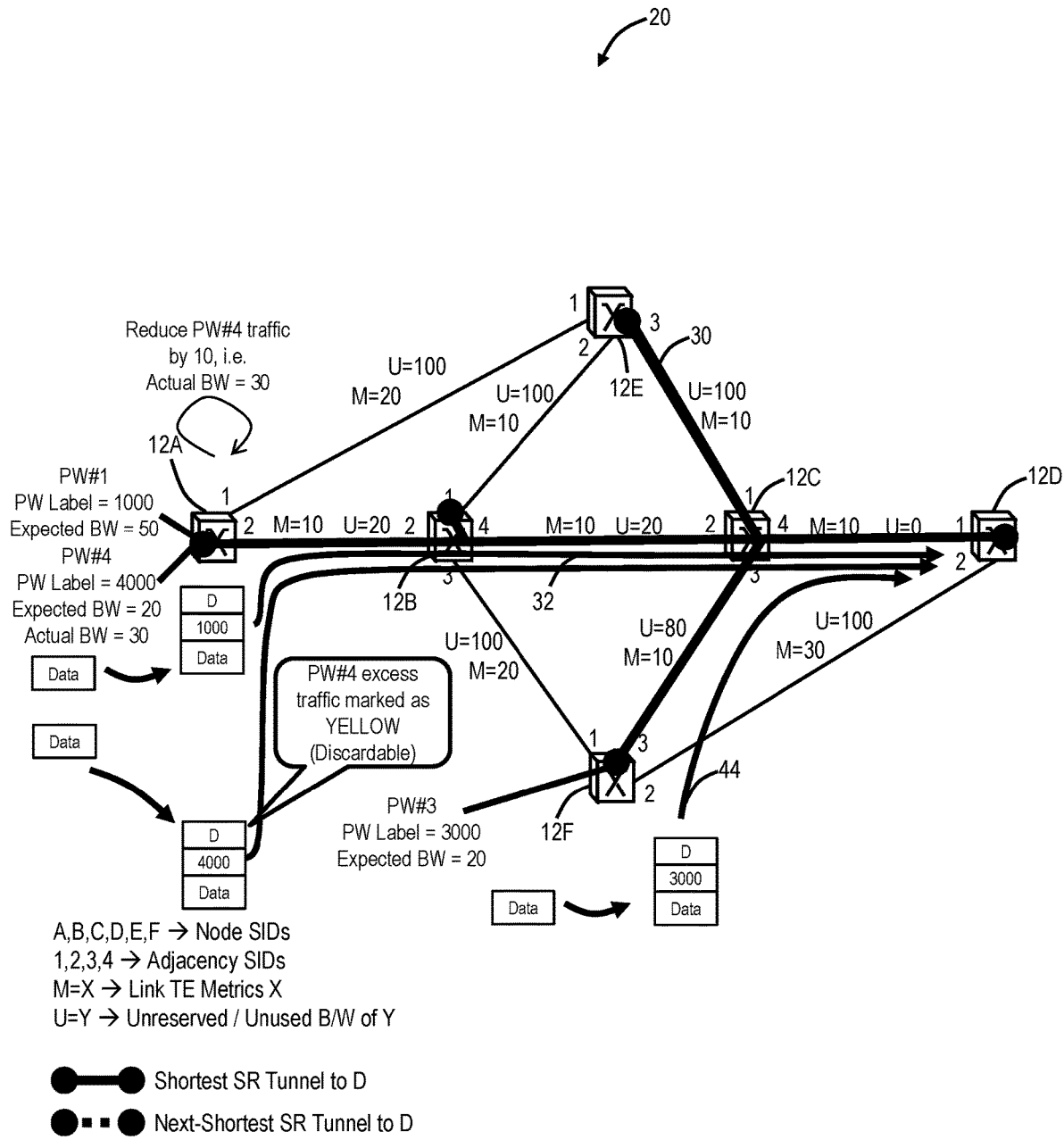
FIG. 21 is a network diagram of the network illustrating the Scenario 3 where the LSR reports congested bandwidth and the ingress LSR discards excess traffic.

FIG. 21 is a network diagram of the network 20 illustrating the Scenario 3 where the LSR reports congested bandwidth and the ingress LSR discards excess traffic. Again, similar to FIGS. 19 and 20, the PW #4 50-1 over the shortest SR tunnel 30 has an expected bandwidth of 20, but an actual bandwidth of 40 with excess traffic marked as discardable (e.g., Yellow). However, instead of the traffic being discarded by the node 12C (LSR), the flooding utilization is provided to the node 12A of U=−10 on the link between the nodes 12C, 12D due to the excess traffic. The node 12A takes action to reduce the PW #4 50-1 traffic by 10, so the actual bandwidth is now 30 instead of 40 (whereas the expected bandwidth is still 20).

Figure 22:
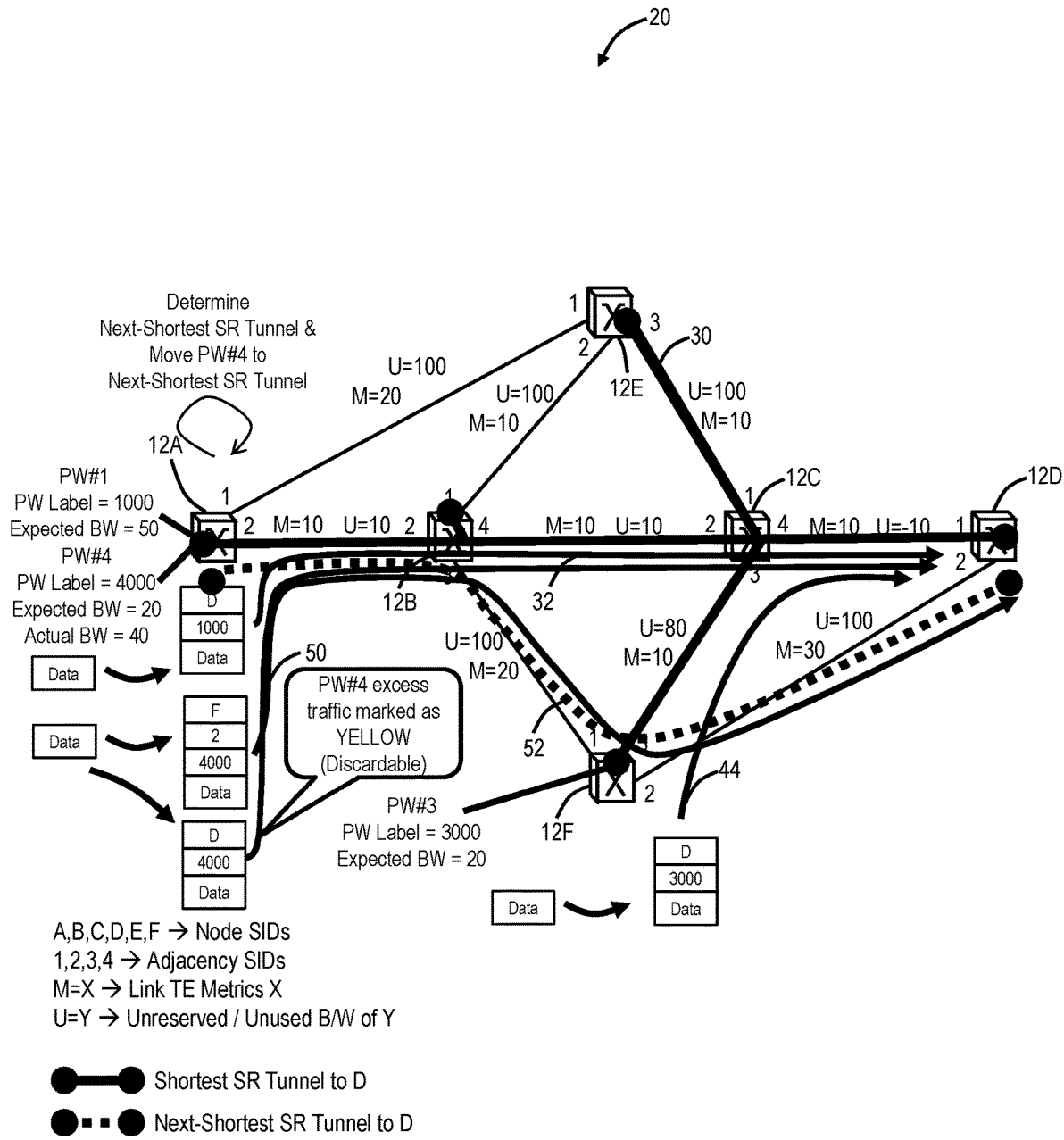
FIG. 22 is a network diagram of the network illustrating the Scenario 4 where the LSR reports congested bandwidth and the ingress LSR moves the services/PWs to alternate tunnels/paths.

FIG. 22 is a network diagram of the network 20 illustrating the Scenario 4 where the LSR reports congested bandwidth and the ingress LSR (LER) moves the services/PWs to alternate tunnels/paths. Again, this is a similar scenario as FIGS. 19-21, except here the node 12A is configured to determine the next shortest SR tunnel 52 and move the PW #4 50-1 to the next shortest SR tunnel 52 instead of continuing to use the shortest SR tunnel 30.

Determining which Service(s) to Act Upon

When the LSRs advertise the congested bandwidth, there is a need to have a mechanism for the ingress LSRs (LERs) to determine which service(s) to take action upon to alleviate congestion. An example mechanism is described as follows. When an LER receives a congested bandwidth advertisement from an LSR, it sets a timer to a value which is set based on its distance to the LSR. For example, the timer could be:

TimerValue=(Number of hops LSR is away from LER)−1

For example, if the advertising LSR is 2 hops away from the LER, then LER sets a timer to 1 unit of time, e.g., seconds, and if the advertising LSR is 6 hops away from the LER, then the LER sets a timer to 5 units of time. Note, that if the LER is adjacent to the advertising LSR then its TimerValue=0, i.e., no timer is started.

When the timer expires (or was not started), then that LER will take action on its service(s)/PW(s) that are passing over an SR tunnel that passes over the congested link and either trim the excess traffic or move such service(s)/PW(s) to another SR tunnel or other action that alleviates congestion. The idea behind this mechanism is that LERs that are closer to the congested link should be given a chance to alleviate congestion. That is, first all LERs 1 hop away from (adjacent to) LSR with congested link will attempt to reduce congestion, if they cannot reduce congestion, then LERs 2 hops away will attempt to reduce congestion, if they cannot reduce congestion, then LERs 3 hops away will attempt to reduce congestion, etc.

Such mechanism is called a "Radius Mechanism" as LERs in increasing (or decreasing as another alternative) distance (radius) from a congested link are asked to act to alleviate congestion. Those skilled in the art will recognize other mechanisms can also be used.

Prioritized PWs Over SR Tunnels

The prior examples all assumed services (e.g., PWs) were of the same class. However, PWs can be different classes, e.g., Class Types, DiffServ Classes, Quality of Service (QoS), EXP bits, etc.—collectively referred to as Service Classes. Packet traffic treatment at links is typically done on per Service Class basis, i.e., if more packet traffic arrives than can be transmitted through a link then lower Service Class traffic may be discarded in favor of higher Service Class traffic.

The link utilization measurements can be done on a per Service Class basis and flooded as such using the existing TE Extensions, i.e., Unreserved Bandwidth may indicate the amount of bandwidth available at each of 8 Service Classes (0 to 7 with 0 being the Highest and 7 being the Lowest), and a negative Unreserved Bandwidth value may imply the amount of certain Service Class packet traffic that is being discarded. For example:

Unreserved Bandwidth[0]=100→100 units of bandwidth is available for Service Class 0

Unreserved Bandwidth[1]=80→80 units of bandwidth is available for Service Class 1

Unreserved Bandwidth[2]=−10→10 units of bandwidth is being discarded for Service Class 2

The above example flood could be for a link with a capacity of 100 units of bandwidth where 20 units are used by Service Class 1 packet traffic and 90 units are used by Service Class 2 traffic. The link is congested by 10 units of bandwidth and packet traffic worth 10 units of bandwidth belonging to Service Class 2 is getting discarded.

Link utilization floods per Service Class would enable all LSRs to know Link Bandwidth Utilization/Usage by Service Class and enable making an intelligent determination when and which PWs' traffic should be discarded at the LER or moved from one SR tunnel to another to alleviate congestion, e.g., when lower Service Class traffic is getting dropped at a particular link along its route (Unreserved Bandwidth value at this lower Service Class is negative for that link) then PWs belonging to such lower Service Class should have their excess traffic dropped or be moved to another SR Tunnel that does not pass over the congested link.

Such prioritized/Service Class based treatment of PWs within SR tunnels is analogous to pre-emption capabilities available for distributed control planes such as MPLS-TE and GMPLS for their tunnel LSPs. Note, in MPLS-TE and GMPLS, it is the tunnel LSPs that are pre-empted (along with all contained Services/PWs), in SR-TE it is the Services/PWs within SR tunnels that are typically pre-empted. This is because in SR-TE there really are no SR tunnels established within the network (no state in the network but only at LERs) and thus there is nothing really to pre-empt in the network.

The pre-emption is delegated to LERs where the SR tunnel state exists, but this is where PW to SR tunnel bindings are maintained, and thus pre-emption is really a function of PW, not SR tunnels, i.e., PWs (all or some) are unmapped from the current SR tunnel and are re-mapped to a different SR tunnel. Note, that it is also possible to pre-empt whole SR tunnels, i.e., to re-define SR tunnel label stacks at tunnel LERs.

SR-TE Process

Figure 23:
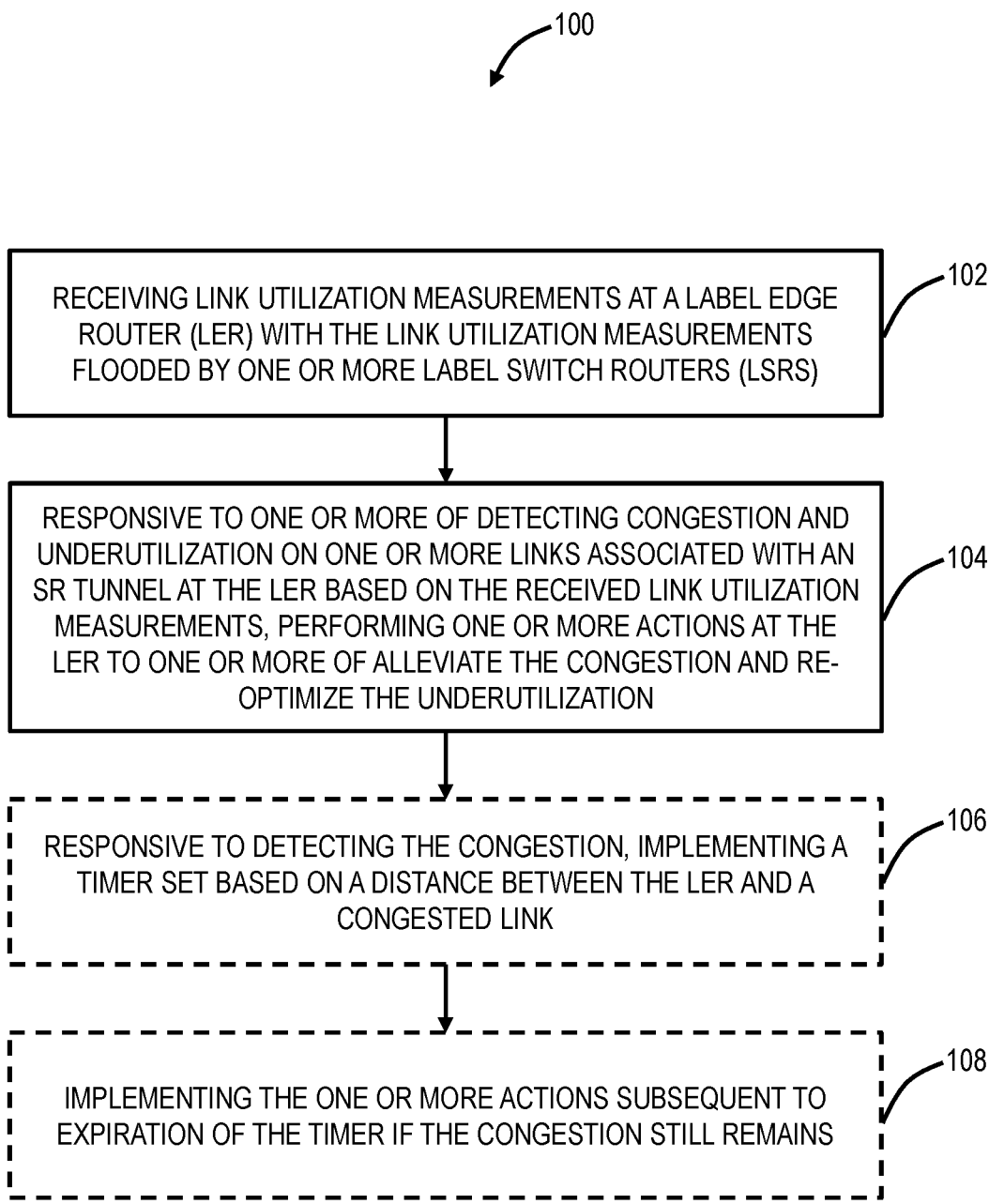
FIG. 23 is a flowchart of a process for Segment Routing (SR) Traffic Engineering (SR-TE) in a network.

FIG. 23 is a flowchart of a process 100 for Segment Routing (SR) Traffic Engineering (SR-TE) in a network. The process 100 includes receiving link utilization measurements at a Label Edge Router (LER) with the link utilization measurements flooded by one or more Label Switch Routers (LSRs) (step 102); and, responsive to one or more of detecting congestion and underutilization on one or more links associated with an SR tunnel at the LER based on the received link utilization measurements, performing one or more actions at the LER to one or more of alleviate the congestion and re-optimize the underutilization (step 104).

A state of the SR tunnel is maintained only at the LER through a label stack assigned at the LER, and the label stack includes one or more of a node Segment ID (SID) and an adjacency SID. Labels are flooded via Interior Gateway Protocol (IGP), and each node in the network determines shortest paths to every other node, and the one or more actions can include veering off the shortest path for the SR tunnel using the adjacency SID. The link utilization measurements can be flooded via existing Interior Gateway Protocol (IGP) Traffic Engineering (TE) extensions and such link utilizations would enable calculation of shortest paths that meet bandwidth constraints of SR tunnels.

Responsive to the LER detecting the congestion, the one or more actions can include discarding excess traffic on one or more services associated with the SR tunnel. Responsive to the LER detecting the congestion, the one or more actions can also include determining another SR tunnel and moving the one or more services to the another SR tunnel. Responsive to the LER detecting the underutilization, the one or more actions can include moving one or more services to the SR tunnel and eliminating one or more other SR tunnels.

The process 100 can further include, responsive to detecting the congestion, implementing a timer set based on a distance between the LER and a congested link (step 106); and implementing the one or more actions subsequent to the expiration of the timer if the congestion still remains (step 108). The link utilization measurements can be managed based on a plurality of service classes for prioritizing services over the SR tunnel.

In another embodiment, a Label Edge Router (LER) in a Segment Routing (SR) network configured to perform SR Traffic Engineering (SR-TE) includes circuitry configured to receive link utilization measurements with the link utilization measurements flooded by one or more Label Switch Routers (LSRs); and circuitry configured to perform one or more actions to one or more of alleviate congestion and re-optimize underutilization responsive to detection of one or more of the congestion and the underutilization on one or more links associated with an SR tunnel based on the received link utilization measurements.

A state of the SR tunnel is maintained only at the LER through a label stack assigned at the LER, wherein the label stack includes one or more of a node Segment ID (SID) and an adjacency SID. Labels are flooded via Interior Gateway Protocol (IGP), and each node in the network determines shortest paths to every other node, and the one or more actions can include veering off the shortest path for the SR tunnel using the adjacency SID. The link utilization measurements are flooded via existing Interior Gateway Protocol (IGP) Traffic Engineering (TE) extensions and such link utilizations would enable calculation of shortest paths that meet bandwidth constraints of SR tunnels.

Responsive to detection of the congestion, the one or more actions can include discarding excess traffic on one or more services associated with the SR tunnel. Responsive to detection of the congestion, the one or more actions can also include determining another SR tunnel and moving the one or more services to the another SR tunnel. Responsive to detection of the underutilization, the one or more actions can include moving one or more services to the SR tunnel and eliminating one or more other SR tunnels.

The LER can further include circuitry configured to implement a timer set based on a distance between the LER and a congested link responsive to the detection of the congestion, wherein the circuitry configured to perform the one or more actions performs the one or more actions subsequent to the expiration of the timer if the congestion still remains. The link utilization measurements can be managed based on a plurality of service classes for prioritizing services over the SR tunnel.

In a further embodiment, a Label Switched Router (LSR) in an Segment Routing (SR) network configured to perform SR Traffic Engineering (SR-TE) includes circuitry configured to measure link utilization on adjacent links associated with the LSR; and circuitry configured to flood the measured link utilization to other nodes in the SR network utilizing existing Interior Gateway Protocol (IGP) Traffic Engineering (TE) extensions, wherein the flooded measured link utilization is utilized by one or more Label Edge Routers (LERs) to one or more of alleviate congestion and re-optimize underutilization on one or more SR tunnels. A state of the SR tunnel is maintained only at an associated LER through a label stack assigned at the LER, and the label stack includes one or more of a node Segment ID (SID) and an adjacency SID.

In summary, the systems and methods include measurement of link utilization in the SR network (using any technique) and flooding such measurements via existing IGP TE extensions (which were initially developed for CAC based signaling protocols, which are absent in SR). The recipient LERs of such flooded measurements can make intelligent decisions regarding: (i) whether links are congested along SR tunnel(s) whose state is maintained on such LERs, and thus action needs to be taken to alleviate congestion; (ii) whether links are underutilized along SR tunnel(s) whose state is maintained on such LERs, and thus re-optimization of PWs/services carried by such SR tunnels can be done to move such PWs/services to "better" SR Tunnels and eliminate unneeded SR Tunnels; (iii) calculate and define new SR tunnels (label stack) when existing SR tunnels fill up; (iv) and other actions.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having a computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A Label Edge Router (LER) in a Segment Routing (SR) network configured to perform SR Traffic Engineering (SR-TE), the LER comprising:
   circuitry configured to:
      receive link utilization measurements flooded by one or more Label Switch Routers (LSRs)
      wherein the link utilization measurements are for links associated with one or more SR tunnels;
      determine whether the one or more SR tunnels are congested, based on one or more of an unreserved bandwidth, a maximum reservable bandwidth, and a maximum bandwidth of corresponding links, where a given SR tunnel is determined to be congested based on one or more of (1) a negative value of the unreserved bandwidth, (2) the maximum reservable bandwidth being greater than the maximum bandwidth, and (3) the maximum reservable bandwidth being equal to the maximum bandwidth; and
      perform one or more routing actions for the one or more SR tunnels based on the determination.

2. The LER as claimed in claim 1, wherein a state of the one or more SR tunnels is maintained only at the LER through a label stack assigned at the LER, wherein the label stack includes one or more of a node Segment ID (SID) and an adjacency SID.

3. The LER as claimed in claim 1, wherein the link utilization measurements are flooded via existing Interior Gateway Protocol (IGP) Traffic Engineering (TE) extensions.

4. The LER as claimed in claim 1, wherein
   responsive to the SR tunnel of the one or more SR tunnels being congested the circuitry is further configured to:
   create a new SR tunnel; and
   move one or more services off of the SR tunnel that is congested to the new SR tunnel.

5. The LER as claimed in claim 1, wherein the SR tunnel of the one or more SR tunnels is congested, and wherein the circuitry is further configured to:
   move one or more services off of the congested SR tunnel of the one or more SR tunnels
   to a next-shortest SR tunnel of the one or more SR tunnels.

6. The LER as claimed in claim 1, wherein the congestion on an associated link of the links associated with the one or more SR tunnels is determined based on the maximum reservable bandwidth.

7. A non-transitory computer-readable storage medium having a computer-readable code stored thereon, the computer-readable code that when executed by a processor of a label edge router (LER), causes the LER to perform steps of:
   receiving link utilization measurements flooded by one or more Label Switch Routers (LSRs)
   wherein the link utilization measurements are for links associated with one or more SR tunnels; determining whether the one or more SR tunnels are congested, based on one or more of an unreserved bandwidth, a maximum reservable bandwidth, and a maximum bandwidth of corresponding links, where a given SR tunnel is determined to be congested based on one or more of (1) a negative value of the unreserved bandwidth, (2) the maximum reservable bandwidth being greater than the maximum bandwidth, and (3) the maximum reservable bandwidth being equal to the maximum bandwidth; and
   causing performance of one or more routing actions for the one or more SR tunnels based on the determination.

8. The non-transitory computer-readable storage medium as claimed in claim 7, wherein a state of the one or more SR tunnels is maintained only at the LER through a label stack assigned at the LER, wherein the label stack includes one or more of a node Segment ID (SID) and an adjacency SID.

9. The non-transitory computer-readable storage medium as claimed in claim 7, wherein the link utilization measurements are flooded via existing Interior Gateway Protocol (IGP) Traffic Engineering (TE) extensions.

10. The non-transitory computer-readable storage medium as claimed in claim 1, wherein
responsive to the SR tunnel of the one or more SR tunnels being congested the steps further include:
causing creation of a new SR tunnel; and
causing a move of one or more services off of the SR tunnel that is congested to the new SR tunnel.

11. The non-transitory computer-readable storage medium as claimed in claim 7, wherein the SR tunnel of the one or more SR tunnels is congested, and wherein the steps further include:
causing a move of one or more services off of the congested SR tunnel of the one or more SR tunnels to a next-shortest SR tunnel of the one or more SR tunnels.

12. The non-transitory computer-readable storage medium as claimed in claim 7, wherein the congestion on an associated link of the links associated with the one or more SR tunnels is determined based on the maximum reservable bandwidth.

13. A method, implemented in a Label Edge Router (LER) in a Segment Routing (SR) network, comprising:
receiving link utilization measurements flooded by one or more Label Switch Routers (LSRs)
wherein the link utilization measurements are for links associated with one or more SR tunnels; determining whether the one or more SR tunnels are congested, based on one or more of an unreserved bandwidth, a maximum reservable bandwidth, and a maximum bandwidth of corresponding links, where a given SR tunnel is determined to be congested based on one or more of (1) a negative value of the unreserved bandwidth, (2) the maximum reservable bandwidth being greater than the maximum bandwidth, and (3) the maximum reservable bandwidth being equal to the maximum bandwidth; and
causing performance of one or more routing actions for the one or more SR tunnels based on the determination.

14. The method as claimed in claim 13, wherein a state of the one or more SR tunnels is maintained only at the LER through a label stack assigned at the LER, wherein the label stack includes one or more of a node Segment ID (SID) and an adjacency SID.

15. The method as claimed in claim 13, wherein the link utilization measurements are flooded via existing Interior Gateway Protocol (IGP) Traffic Engineering (TE) extensions.

16. The method as claimed in claim 13,
responsive to the SR tunnel of the one or more SR tunnels being congested, the method further comprising:
causing creation of a new SR tunnel; and
causing a move of one or more services off of the SR tunnel that is congested to the new SR tunnel.

17. The method as claimed in claim 13, wherein the SR tunnel of the one or more SR tunnels is congested, and the method further comprising:
causing a move of one or more services off of the congested SR tunnel of the one or more SR tunnels to a next-shortest SR tunnel of the one or more SR tunnels.

* * * * *